US009374429B2

(12) United States Patent
Gaiser et al.

(10) Patent No.: US 9,374,429 B2
(45) Date of Patent: Jun. 21, 2016

(54) SYSTEM AND METHOD FOR SHARING EVENT INFORMATION USING ICONS

(71) Applicant: SONY CORPORATION, Tokyo (JP)

(72) Inventors: Jonathan Paul Gaiser, San Diego, CA (US); Bryan John Mihalov, Escondido, CA (US); Libiao Jiang, San Diego, CA (US); Benjamin Wai-Ming Lo, San Diego, CA (US); Tonni Sandager Larsen, Escondido, CA (US); Hye Hoon Yi, Escondido, CA (US)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 13/777,060

(22) Filed: Feb. 26, 2013

(65) Prior Publication Data
US 2014/0173459 A1 Jun. 19, 2014

Related U.S. Application Data

(63) Continuation-in-part of application No. 13/717,971, filed on Dec. 18, 2012.

(51) Int. Cl.
*G06F 3/0481* (2013.01)
*G06F 3/0484* (2013.01)
(Continued)

(52) U.S. Cl.
CPC ............ *H04L 67/22* (2013.01); *G06F 3/04817* (2013.01); *G06F 3/04842* (2013.01); *G06Q 10/109* (2013.01); *G06Q 50/01* (2013.01)

(58) Field of Classification Search
CPC .................................................. G06F 3/04842
USPC ......................................................... 715/752
See application file for complete search history.

(56) References Cited

U.S. PATENT DOCUMENTS 7,991,636 B1 * 8/2011 Groves .......................... 705/7.18
8,190,618 B2    5/2012 Berstis et al.
(Continued)

FOREIGN PATENT DOCUMENTS

JP    2005011145    1/2005
JP    2008527563    7/2008
WO    2006075334    7/2006

OTHER PUBLICATIONS

Jonathan Paul Gaiser, Libiao Jiang, Benjamin Wai-Ming, Tonni Larsen, Bryan Mihalov, Hye Hoon Yi, "System and Method for Sharing Event Information Using Icons", related U.S. Appl. No. 13/717,971 non-final office action dated Oct. 24, 2014.

(Continued)

*Primary Examiner* — Tuyetlien T Tran
*Assistant Examiner* — David S Posigian
(74) *Attorney, Agent, or Firm* — John L. Rogitz; John M. Rogitz

(57) ABSTRACT

Thus, in one embodiment an apparatus includes at least one processor, at least one display controlled by the processor, and at least one wireless transceiver communicating with the processor. The processor is configured to transmit a message accessible to at least one recipient that includes data representing at least one non-alphanumeric who icon representing a person, at least one non-alphanumeric what icon representing an event and/or activity, and at least one non-alphanumeric when icon representing a time associated with the event and/or activity. Furthermore, at least one of the following represented by data included in the message is modifiable based on input from at least one recipient: the at least one who icon, the at least one what icon, and the at least one when icon.

19 Claims, 26 Drawing Sheets

(51) Int. Cl.
*G06Q 50/00* (2012.01)
*H04L 29/08* (2006.01)
*G06Q 10/10* (2012.01)

(56) References Cited

U.S. PATENT DOCUMENTS

| | | | |
|---|---|---|---|
| 8,234,120 | B2 | 7/2012 | Agapi et al. |
| 8,397,181 | B2 | 3/2013 | Hartman et al. |
| 8,745,141 | B2 | 6/2014 | Rosenberg et al. |
| 2002/0171628 | A1 | 11/2002 | Tani et al. |
| 2005/0288005 | A1 | 12/2005 | Roth et al. |
| 2007/0124371 | A1 | 5/2007 | Desai et al. |
| 2008/0034047 | A1 | 2/2008 | Rosenberg et al. |
| 2008/0040693 | A1 | 2/2008 | Toyama et al. |
| 2008/0216022 | A1* | 9/2008 | Lorch et al. .................. 715/847 |
| 2009/0018887 | A1* | 1/2009 | Bank .................. G06Q 10/109 705/7.13 |
| 2009/0313299 | A1* | 12/2009 | Bonev .................. G06Q 10/109 |
| 2010/0082357 | A1* | 4/2010 | Follmann et al. .................. 705/1 |
| 2010/0205538 | A1 | 8/2010 | Han et al. |
| 2010/0228577 | A1 | 9/2010 | Cunningham et al. |
| 2010/0235776 | A1 | 9/2010 | Brown |
| 2010/0251177 | A1 | 9/2010 | Geppert et al. |
| 2010/0325205 | A1 | 12/2010 | Murphy et al. |
| 2011/0045811 | A1 | 2/2011 | Kemery |
| 2011/0231409 | A1* | 9/2011 | Dhara et al. .................. 707/748 |
| 2011/0238755 | A1* | 9/2011 | Khan et al. .................. 709/204 |
| 2011/0258125 | A1* | 10/2011 | Iyer .................. 705/301 |
| 2011/0289142 | A1* | 11/2011 | Whalin et al. .................. 709/203 |
| 2012/0102415 | A1 | 4/2012 | Deng et al. |
| 2012/0110064 | A1 | 5/2012 | Chen et al. |
| 2012/0136689 | A1* | 5/2012 | Ickman .................. H04W 4/206 705/7.19 |
| 2012/0137252 | A1 | 5/2012 | Inai |
| 2012/0290977 | A1 | 11/2012 | Devecka |
| 2012/0290978 | A1* | 11/2012 | Devecka .................. 715/810 |
| 2013/0055112 | A1 | 2/2013 | Joseph et al. |
| 2013/0151956 | A1 | 6/2013 | Allen |
| 2013/0174275 | A1 | 7/2013 | Micucci et al. |

OTHER PUBLICATIONS

Jonathan Paul Gaiser, Libiao Jiang, Benjamin Wai-Ming, Tonni Larsen, Bryan Mihalov, Hye Hoon Yi, "System and Method for Sharing Event Information Using Icons", related U.S. Appl. No. 13/717,971 applicants response to non-final office action filed Nov. 10, 2014.

Jonathan Paul Gaiser, Libiao Jiang, Benjamin Wai-Ming Lo, Tonni Larsen, Bryan Mihalov, Hye Hoon Yi, "System and Method for Sharing Event Information Using Icons" related pending U.S. Appl. No. 13/717,971.

Jonathan Paul Gaiser, Libiao Jing, Benjamin Wai-Ming Lo, Tonni Larsen, Bryan Mihalov, Hye Hoon Yi, "System and Method for Sharing Event Information Using Icons" final office action of related U.S. Appl. No. 13/717,971 dated Feb. 25, 2015.

* cited by examiner

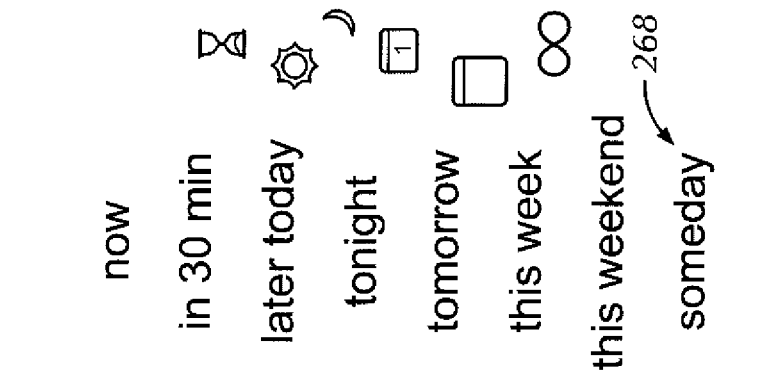
FIG. 16
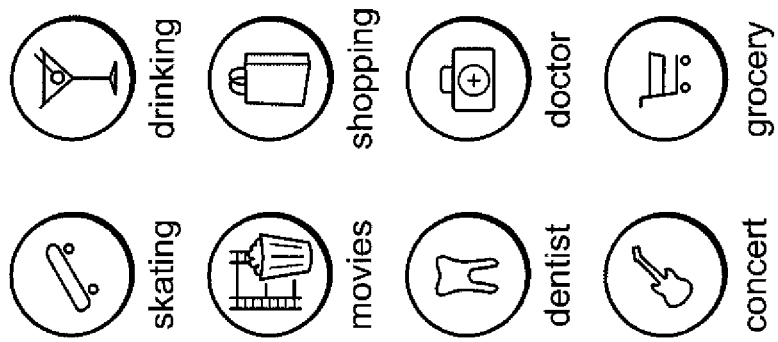
FIG. 15
FIG. 14

336

| Me Too<br>A place<br>to connect | Vote on<br>Charlie's Post — 372 |

— 374

When would you like to join him?

○ Today
○ This Weekend  } 376
○ Next Week

— 380

Where do you want to skate?

○ School Steps
○ Skate Park   } 382
○ Panic Hill

— 378 [Submit]

| Me Too<br>A place<br>to connect | People Who Can<br>Modify Your Posts — 384 |

When would you like to join him?

386 { (image) Claire  [x]
      (image) Richard [x] } 388
      (image) Roy    [x]

Add: [_____] — 390     [Submit] — 392

FIG. 33

SYSTEM AND METHOD FOR SHARING EVENT INFORMATION USING ICONS

Priority is claimed to U.S. patent application Ser. No. 13/717,971, filed Dec. 18, 2 012, of which this application is a continuation in part. Accordingly, U.S. patent application Ser. No. 13/717,971 is incorporated herein in its entirety.

FIELD OF THE INVENTION

The present application is directed to sharing events and activities in a social networking context using consumer electronics devices such as smartphones and tablet computers.

BACKGROUND OF THE INVENTION

The increasing prevalence of mobile, hand-held, and touch screen consumer electronics (CE) devices presents the increased the ability of CE device users to communicate with each other. However, many of these CE devices do not have an adequate input area on which to comfortably and accurately type messages. For example, a touch-screen "smart" watch may not have a keyboard of any kind. Even if it were to have one, typing on a CE device of that size would prove difficult and frustrating. Present principles recognize the foregoing observations and provide improved methods and devices for CE device users to communicate with each other.

SUMMARY OF THE INVENTION

Accordingly, as recognized herein icons related to various activities a user is or will be participating in, as well as various locations a user is or will be going, can be transmitted to the user's contacts to convey information without utilizing, e.g., a conventional keyboard. In addition, the present application recognizes that behavioral tracking based on, e.g., past icon selection may be used to predict which icons will be selected for future activities. Even further, present principles recognize that individuals to whom information is conveyed may modify the information so that, e.g., a group of people may participate in the activity as modified.

The CE devices discussed herein are typically, by not necessarily, portable and may be implemented, without limitation, by (and communicate with) smart phones, music players, smart watches, tablet computers, personal digital assistants (PDAs), laptop computers, e-readers such as electronic books, a vehicle's electronic system and/or display, televisions including Internet-enabled and smart TVs, and still other CE devices.

Thus, in one embodiment an apparatus includes at least one processor, at least one display controlled by the processor, and at least one wireless transceiver communicating with the processor. The processor is configured to transmit a message accessible to at least one recipient that includes data representing at least one non-alphanumeric who icon representing a person, at least one non-alphanumeric what icon representing an event and/or activity, and at least one non-alphanumeric when icon representing a time associated with the event and/or activity. Furthermore, at least one of the following represented by data included in the message is modifiable based on input from at least one recipient: the at least one who icon, the at least one what icon, and the at least one when icon. In addition, if desired the message may include data representing at least one non-alphanumeric where icon representing a location.

In some embodiments, data included in the message representing the at least one when icon may be modifiable based on input from at least one recipient, and likewise data representing the at least one where icon may be modifiable based on input from at least one recipient. Based on the modification(s), a modification to the message may then be accessible by the apparatus.

Also in some embodiments, the message may be accessible through a social networking service. The message may constitute an original post on the social networking service such that the data is for an original post and thus the original post may itself be modifiable rather than adding additional data to the post through an additional comment. In addition to or in lieu of the foregoing, if desired, data for an original post may itself be modifiable rather than replying to the post. Also in addition to or in lieu of the foregoing, if desired the message may be modifiable based a poll such that the results of the poll modify the message, where the poll may be accessible to at least one recipient for participation in the poll.

In addition, if desired the message may be modifiable in any of the ways disclosed herein based on input from a recipient only if the recipient is included in an index of recipients that are approved to modify messages transmitted by the apparatus. Moreover, the index may be determined by a user associated with the apparatus such that unapproved individuals (e.g., unapproved social networking friends) cannot modify the original post.

Also in exemplary embodiments, the message may include data representing a participation icon that is selectable by at least one recipient to cause the recipient to transmit a reply message to the apparatus indicating the desire of a user associated with the recipient to participate in the event and/or activity. Further, the processor may be configured to transmit the message at least in part by creating an activity page on a social networking service, where the activity page is accessible to at least one recipient and reflects information regarding the event and/or activity.

In another aspect, an apparatus includes at least one processor, at least one display controlled by the processor, and at least one wireless transceiver communicating with the processor. The processor is configured to transmit a message accessible to at least one recipient that includes data representing at least one non-alphanumeric who icon representing a person, at least one non-alphanumeric what icon representing an event and/or activity, and at least one non-alphanumeric when icon representing a time associated with the event and/or activity. Additionally, the processor is configured to recommended, to a user associated with the apparatus for inclusion at least of associated data in the message, at least one of the following based at least in part on behavioral tracking: the at least one who icon, the at least one what icon, and the at least one when icon.

In still another aspect, a method includes accessing a social networking service and transmitting a message through the social networking service that includes data representing at least one non-alphanumeric who icon representing a person, at least one non-alphanumeric what icon representing an event and/or activity, and at least one non-alphanumeric when icon representing a time associated with the event and/or activity.

The details of the present invention, both as to its structure and operation, can best be understood in reference to the accompanying drawings, in which like reference numerals refer to like parts, and in which:

BRIEF DESCRIPTION OF THE DRAWINGS

FIG. 14 show additional exemplary who icons;

FIG. 15 show additional exemplary what icons;

FIG. 16 show additional exemplary when icons;

FIG. 32 is an exemplary poll for voting on a modification to a Me Too message;

FIG. 33 is an exemplary UI showing an index of users approved to modify original Me Too messages;

DETAILED DESCRIPTION OF THE PREFERRED EMBODIMENT

It is to be understood that the figures below generally show methods steps in conjunction with the devices disclosed herein.

Figure 1:
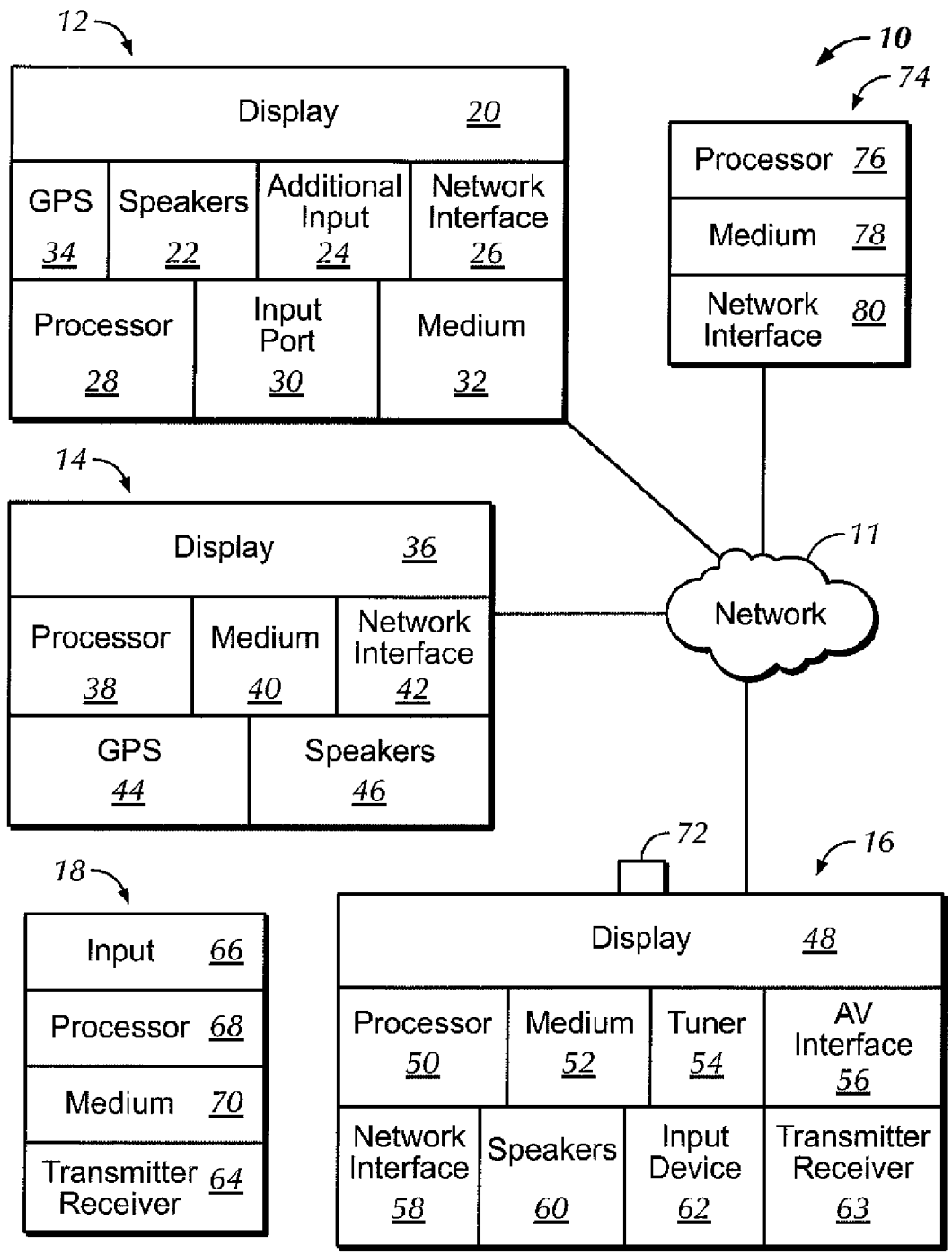
FIG. 1 is a block diagram of an example system for exchanging Me Too messages and information.

Beginning in reference to FIG. 1, an exemplary system 10 is shown. The system 10 includes a tablet computer 12, smart watch 14, and television 16 associated with a remote control (RC) 18. First describing the tablet computer 12, it includes a touch enabled display 20, one or more speakers 22 for outputting audio such as audible alerts, and an additional input device 24 such as, e.g., a track pad or an audio receiver/microphone for receiving voice commands and input. The tablet computer 12 also includes a network interface 26 for communication over at least one network 11 such as the Internet, an WAN, an LAN, etc. under control of a processor 28, it being understood that the processor 28 controls the tablet computer 12. The network interface 26 may be, e.g., a wired or wireless modem or router, or other appropriate interface such as, e.g., a wireless telephony transceiver. In addition, the tablet computer 12 includes an input port 30 such as, e.g., a USB port, and a tangible computer readable storage medium 32 such as disk-based or solid state storage. Moreover, a GPS receiver 34 is included on the tablet computer 12 and is configured to receive geographic position information from at least one satellite and provide the information to the processor 28, though it is to be understood that another suitable position receiver other than a GPS receiver may be used in accordance with present principles.

Also shown in FIG. 1 is a smart watch 14. The watch 14 includes a touch enabled display 36, a processor 38 controlling the watch 14, a tangible computer readable storage medium 40 such as disk-based or solid state storage, and a network interface 42 such as, e.g., a wired or wireless modem or router, or other appropriate interface such as, e.g., a wireless telephony transceiver, it being understood that the network interface 42 communicates over the network 11. Note that additional input devices may also be included on the smart watch 14, such as, e.g., an audio receiver/microphone for receiving voice commands and input. The smart watch 14 also includes a GPS receiver 44 configured to receive geographic position information from at least one satellite and provide the information to the processor 38, though it is to be understood that another suitable position receiver other than a GPS receiver may be used in accordance with present principles. Also note that at least one speaker 46 is shown for outputting audio such as audible alerts.

As previously indicated, the system 10 may also include a television (TV) 16. The TV 16 may be Internet-enabled, a smart TV, and/or a touch enabled TV. Accordingly, the TV 16 includes a touch enabled display 48. The TV 16 also includes a processor 50 controlling the TV 16, a tangible computer readable storage medium 52 such as disk-based or solid state storage, and a TV tuner 54. Additionally, the TV 16 includes an audio/video interface 56 to communicate with other devices electrically/communicatively connected to the TV 16 such as, e.g., a set-top box, a DVD player, or a video game console over, e.g., an HDMI connection. The TV also includes a network interface 58 such as, e.g., a wired or wireless modem or router, or other appropriate interface such as, e.g., a wireless telephony transceiver, it being understood that the network interface 58 communicates over the network 11. Furthermore, the TV 16 includes at least one speaker 60 and an input device 62 such as, e.g., a keypad and/or audio receiver/microphone for receiving voice commands and input. Note that a camera 72 is also shown and may be, e.g., a thermal imaging camera, a digital camera such as a webcam, and/or camera integrated into a TV 16 and controllable by the processor 50 to gather pictures/images and video of viewers/users of the TV 16. Though not shown, in certain embodiments the TV 16 may also include a GPS receiver in accordance with present principles.

The TV 16 also has a transmitter/receiver 63 for communicating with a TV remote control 18 associated with the TV 16 to thus input commands using the RC 18 to control the TV 16. Accordingly, the RC 18 also has a transmitter/receiver 64 for communicating with the TV 16 through the transmitter/receiver 63. The RC 18 also includes an input device 66 such as a keypad or touch screen display, as well as a processor 68 for controlling the RC 18 and a tangible computer readable storage medium 70 such as disk-based or solid state storage.

Still in reference to FIG. 1, a server 74 is also shown. The server 74 includes at least one processor 76, at least one tangible computer readable storage medium 78 such as disk-based or solid state storage, and at least one network interface 80 that, under control of the processor 76, allows for communication with the devices 12, 14, and 16 over the network 11. Note that the network interface 80 may be, e.g., a wired or wireless modem or router, or other appropriate interface such as, e.g., a wireless telephony transceiver. Accordingly, in some embodiments the server 74 may be an Internet server and may include and perform "cloud" functions such that the devices 12, 14, and 16 access a "cloud" environment via the server 74.

Figure 2:
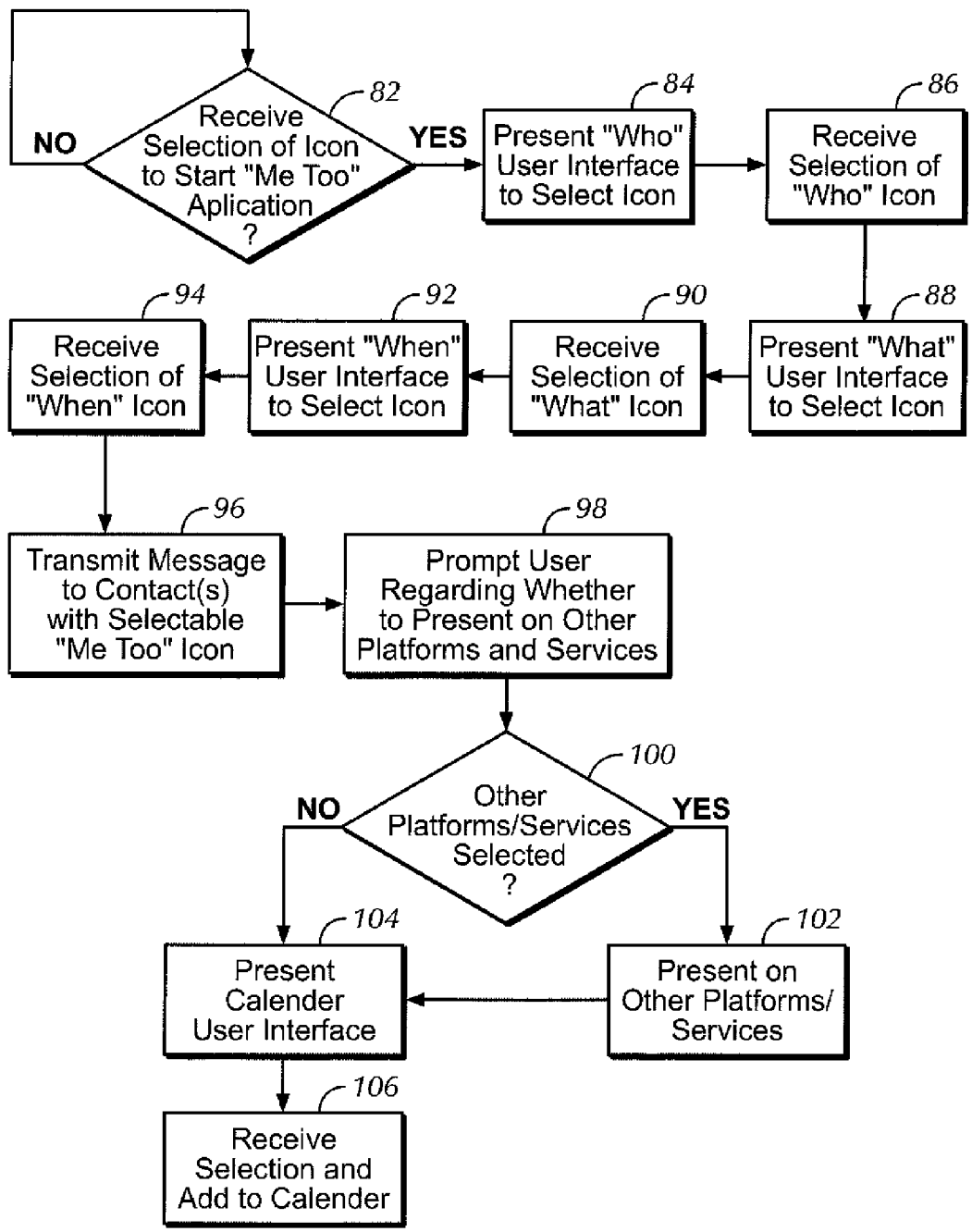
FIG. 2 is a flow chart of example logic for sending a "Me Too" message from a sending CE device.

Before describing FIG. 2, note that present principles recognize that the devices 12, 14, 16, and 74, and any other devices used in accordance with present principles, may include some or all of the components described in reference to any of the other devices to undertake present principles. Even further, it is to be understood that that the respective processors described above are capable of executing all or part of the logic discussed below to undertake present principles. Moreover, note that software code implementing present logic executable by the respective processors may be stored on the respective mediums of each device to undertake present principles. For completeness, also note that the respective displays and speakers of the devices shown in FIG. 1 are able to present information in accordance with present principles under control of their respective processors.

Last, note that other CE devices other than the ones shown in FIG. 1 may be used in accordance with present principles, such as, e.g., smart phones, music players, personal digital assistants (PDAs), laptop and desktop computers, e-readers such as electronic books, and a vehicle's electronic system and/or display.

Now in reference to FIG. 2, a flow chart of example logic for sending a "Me Too" message from a sending CE device using, e.g., a "Me Too" application or service in accordance with present principles is shown, it being understood that present principles may be implemented by state logic as well as deterministic logic flows. Beginning at decision diamond 82, the logic determines whether it has received a user's selection of a "Me Too" icon, and/or input to launch a "Me Too" application and/or process. If the logic determines no such thing has been received, the logic may loop back around and continue making the determination at diamond 82 until such time as an affirmative determination is made.

After making an affirmative determination at diamond 82, the logic proceeds to block 84 where the logic presents a "who" user interface (UI) from which a user may select an icon representing, e.g., himself or herself (such as a photograph). Thus, in some embodiments the icon selected at block 84 may include a picture of the user. After receiving the "who" icon selection at block 86, the logic then moves to block 88 where the logic presents a "what" user interface (UI) from which a user may select an event, activity, etc., in which the user wishes to participate. The "what" selection is then received at block 90.

Thereafter, the logic proceeds to block 92 where the logic presents a "when" UI from which a user may select, e.g., a general and/or approximate time of day for when the user intends to participate in the event or activity. For instance, one option that may be presented on the "when" UI may be a selectable "this afternoon" element, indicating that the user wishes to participate in the event or activity later that day. The logic then receives the "when" selection at block 94 and proceeds to block 96. At block 96 the logic processes the user selections, creates a message including the icons and/or information input by the user, and transmits the message to one or more of the user's contacts. The contacts that receive the message may have been, e.g., previously designated by the user. For instance, the user may have previously designated friends in the "Me Too" application that are to receive "Me Too" messages, or the user may have previously linked a contact list to the "Me Too" application from which friends to receive the message may be selected. Still further, the user may select particular contacts after the message is created but before it is sent.

Regardless, it is to be understood that the message that is transmitted includes a selectable "Me Too" icon and/or invitation that may be selected by a recipient of the message to indicate that the recipient intends to participate or join with the user in the event or activity. Accordingly, the message may be configured to cause the recipient to send an accept message back to the apparatus when the "Me Too" icon and/or invitation is selected at the recipient device.

Still in reference to FIG. 2, the logic moves from block 96 to block 98 where the logic prompts the user to select whether to present the "Me Too" icons and/or information described above to other people through, e.g., another application, service, or platform such as a social networking service. At block 98 the logic may even present a list of other platforms or services that are selectable by a user to present the "Me Too" icons/information thereon, such as a Twitter selector and a Facebook selector. Then at decision diamond 100 the logic determines whether an affirmative or negative response to the prompt presented at block 98 has been received. If the logic determines that an affirmative response has been received, the logic proceeds to block 102 where the logic publishes, presents, transmits, creates an events page regarding, etc., the "Me Too" icons/information to/on the selected applications, services, and/or platforms. The logic then proceeds to block 104. However, if a negative response was determined to have been received at diamond 100, the logic skips block 102 and moves directly to block 104.

At block 104 the logic prompts the user to select whether to add the event to a calendar associated with the user such as, e.g., a Google calendar. Assuming the user responds to the prompt by indicating that he or she wishes the event be added to their calendar, the logic then moves to block 106 where it receives the response and automatically adds the event and any associated information to the calendar(s). Otherwise, the logic may end.

Figure 3:
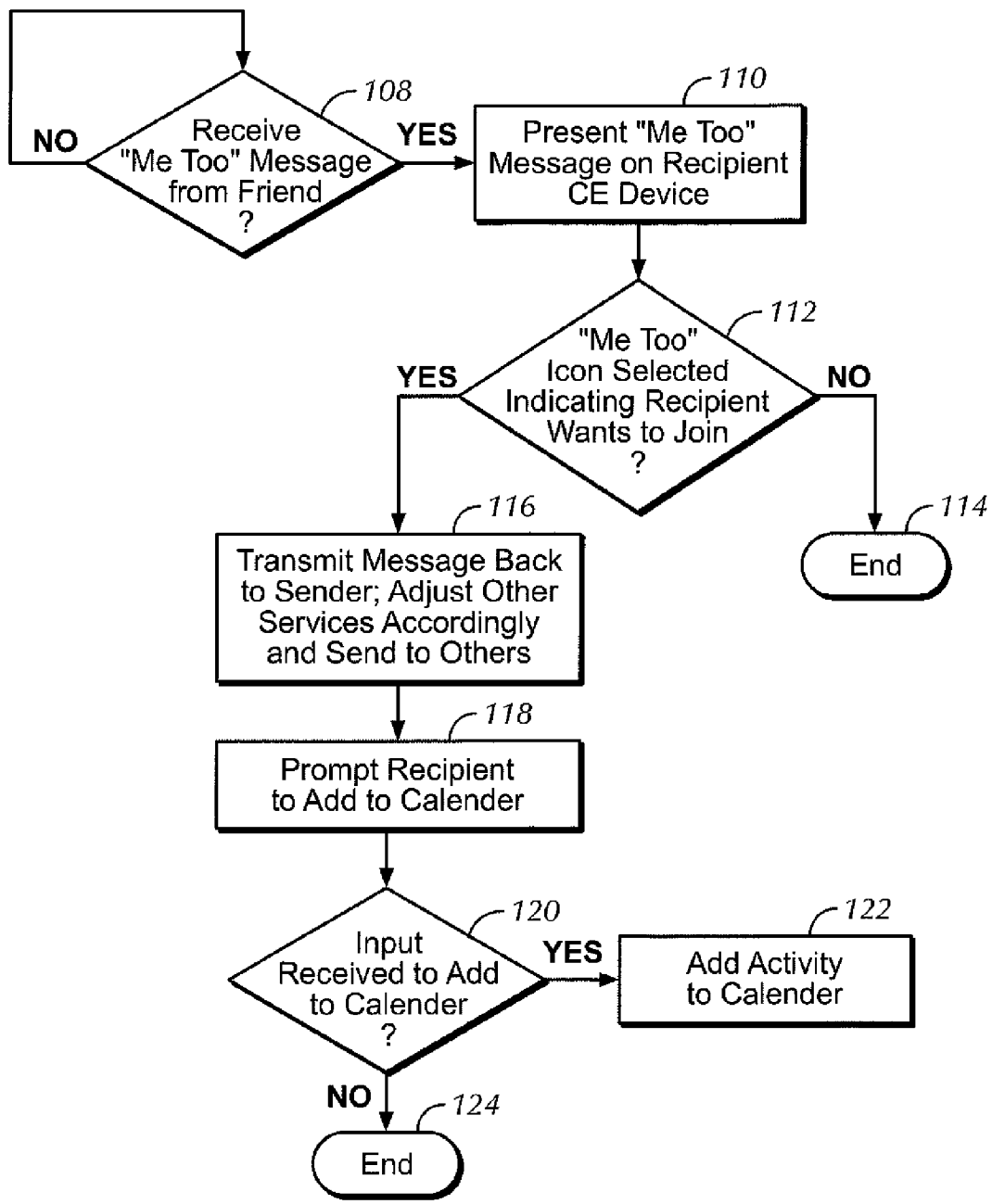
FIG. 3 is a flow chart of example logic for receiving a "Me Too" message at a receiving CE device.

Before describing FIG. 3, it is to be understood that in varying embodiments the message may or may not include data representing an alpha-numeric descriptor of at least one of the selected icons for overlay of the descriptor on the one icon. Moreover, voice commands may be used in accordance with present principles to input any of the selections described herein, e.g., when prompted by the prompts described herein, and that voice commands may be used to input and/or specify additional information as well.

Now in reference to FIG. 3, a flow chart of example logic for receiving a "Me Too" message at a receiving CE device in accordance with present principles is shown. Beginning at block 108, the logic determines whether it has received a "Me Too" message from, e.g., a friend or family member over a "Me Too" service indicating that the friend is participating in an activity at a certain time. If the logic determines no such message has been received, the logic may loop back around and continue making the determination at diamond 108 until such time as an affirmative determination is made.

After making an affirmative determination at diamond 108, the logic proceeds to block 110 where the logic presents the "Me Too" message on the user's CE device. The logic then proceeds to decision diamond 112 where the logic determines whether a "Me Too" icon/invitation included with the message has been selected by the user. If the logic determines that the "Me Too" icon/invitation has not been selected, the logic may move to block 114 where the logic ends. However, if the logic determines that the "Me Too" icon/invitation has been selected, the logic instead moves to block 116 where the logic transmits/returns a response message to the sender indicating the user's desire to join the activity specified in the "Me Too" message sent by the sender.

If desired, the response message may also be sent to other contacts, e.g., also using the "Me Too" application. The other people may be selected, e.g., from a contact list or input by the user. Also if desired, the user may be prompted with and select an emoticon to be included in the response message.

Still in reference to FIG. 3, after block 116 the logic moves to block 118 where a prompt is presented on the CE device asking the user whether the activity should be added to a calendar associated with the user, such as, e.g., a Google calendar. The logic then moves to decision diamond 120 where the logic determines whether input has been received from the user indicating that the user would like to add the activity to the user's calendar(s). If the user responds to the prompt by indicating that he or she wishes the activity be added to their calendar(s), the logic then moves to block 122 where it receives the response and automatically adds the event to the calendar(s). If no response has been received, or if the user provides input indicating the user does not wish to add the activity and any associated information to one or more of the user's calendars, the logic instead moves to block 124 where it ends. Note that in exemplary embodiments, the calendars described above in reference to FIGS. 2 and 3 (or any other calendar used in accordance with present principles) may be, e.g., group or community calendars viewable by members of the group or community (e.g., a Yahoo Group).

Figure 4:
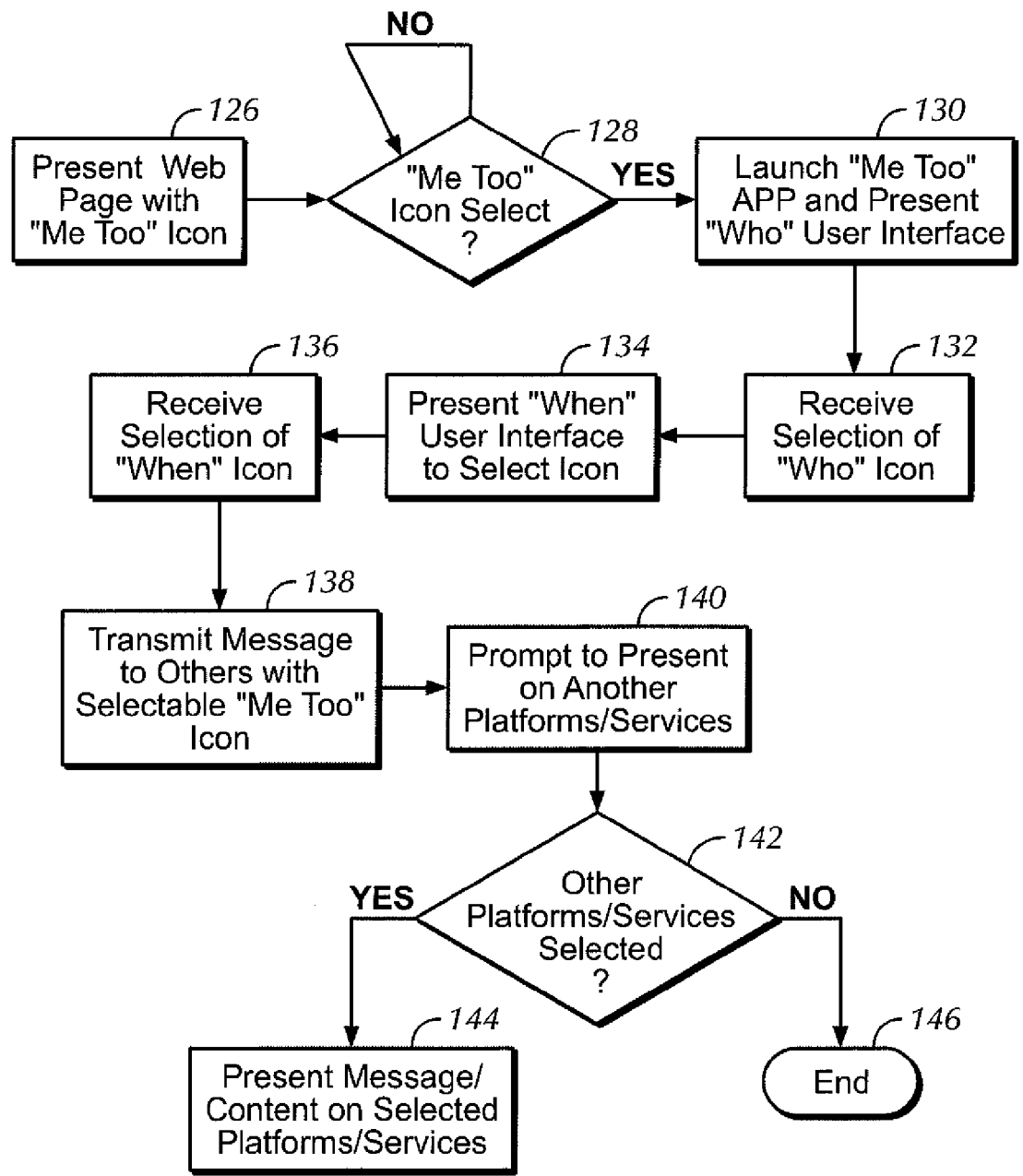
FIG. 4 is a flow chart of example logic for sending a "Me Too" message responsive to selection of a "Me Too" icon on a webpage.

Turning to FIG. 4, a flow chart of example logic for sending a "Me Too" message responsive to selection of a "Me Too" icon on a webpage is shown. For example, the logic of FIG. 4 may be executed when a user of a CE device is navigating a shopping website and comes across an item they wish to purchase at a later time. A selectable "Me Too" icon such as those described herein may be overlaid on to a portion of the webpage. Thus, when selected, the "Me Too" icon may initiate the logic presently described.

Accordingly, the logic begins at block 126 where the logic presents a webpage such as, e.g., an Amazon.com page for a particular book. The logic also overlays or otherwise presents a selectable "Me Too" icon on the page at block 126, although it is to be understood that in other embodiments the content provider (e.g., Amazon.com) or another third party may include a "Me Too" icon on the webpage itself (e.g., such that the logic of FIG. 4 need not overlay a "Me Too" icon) and be able to execute a "Me Too" application in accordance with present principles. In other words, third parties such as websites may participate in the actions and undertake all or part of the logic described herein.

Regardless, after block 126 the logic moves to decision diamond 128 where the logic determines whether it has received a selection of the "Me Too" icon. If the logic determines that it has not received such a selection, the logic may loop back to diamond 128 and continue until such time as the "Me Too" icon is selected. Once the "Me Too" icon is selected from, e.g., a webpage, the logic then moves to block 130 where the logic launches a "Me Too" application/process on the CE device viewing the webpage and presents a "who" UI such as those described herein. Then at block 132 the logic receives the user's "who" icon selection and moves to block 134, where the logic presents a "what" UI such as those described herein. The logic then moves to block 136 where the logic receives the user's "what" icon selection.

Thereafter, the logic proceeds to block 138 where the logic processes the user selections, creates a message including the icon selections and/or information input by the user, and transmits the message to one or more of the user's friends in accordance with present principles. Note that the message transmitted at block 138 may include a link to the website on which the selected "Me Too" icon was overlaid so that recipients of the message may view the website by clicking the link. Thus, for instance, if a user wants to purchase a book at a later time, the user may select a "Me Too" icon overlaid on the E-store webpage for the book to cause the user's CE device to transmit a message containing a link to the webpage and an indication that the user wishes to buy the book at a later time, which may then be viewable by the user's contacts.

Still in reference to FIG. 4, the logic proceeds from bock 138 to block 140 where the logic prompts the user to select whether to present the "Me Too" icons and/or information described above to other people through, e.g., another application or service such as a social networking service. At block 140 the logic may even present a list of other services that are selectable by a user to present the "Me Too" icons/information thereon, such as a Twitter selector and a Facebook selector. Then at decision diamond 142 the logic determines whether an affirmative or negative response to the prompt presented at block 140 has been received. If the logic determines that an affirmative response has been received, the logic proceeds to block 144 where the logic posts, publishes, presents, transmits, creates an events page regarding, etc., the "Me Too" icons/information (including, e.g., a link to the webpage, a screen shot of the webpage or item to be purchased, an icon reflecting the item to be purchased, etc.) to/on the selected applications and/or services. However, if a negative response was determined to have been received at diamond 142, the logic instead jumps to block 146 where the logic ends.

Figure 5:
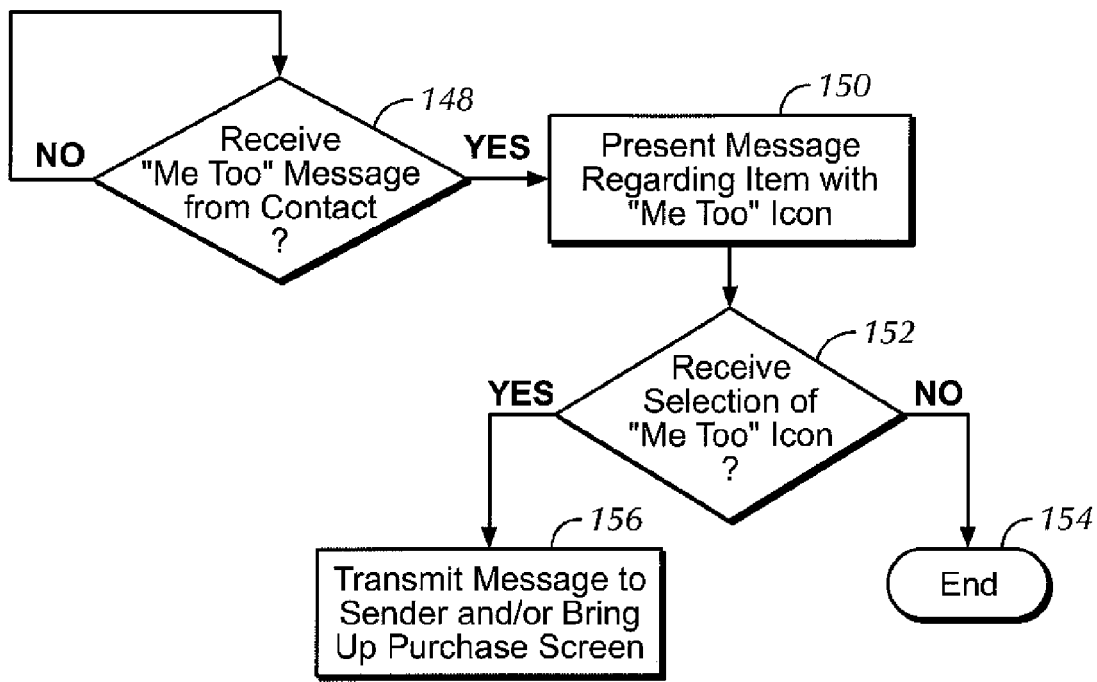
FIG. 5 is a flow chart of example logic for receiving a "Me Too" message at a receiving CE device once sent in response to selection of a Me Too icon on a webpage.

Now in reference to FIG. 5, a flow chart of example logic for receiving a "Me Too" message at a receiving CE device once sent as described in reference to FIG. 4 is shown (e.g., the message includes a link to a webpage). Beginning at decision diamond 148, the logic determines whether it has received a "Me Too" message from, e.g., a friend over a "Me Too" platform/service indicating that the friend wishes to purchase an item. If the logic determines no such message has been received, the logic may loop back around and continue making the determination at diamond 148 until such time as an affirmative determination is made.

After making an affirmative determination at diamond 148, the logic proceeds to block 150 where the logic presents the "Me Too" message on the user's CE device. However, it is to be understood that in other embodiments and/or by changing one or more settings of the "Me Too" application executing on the recipient's CE device, the logic may cause the webpage itself rather than the Me Too message to be presented on the CE device.

Regardless, after presenting the Me Too message the logic proceeds to decision diamond 152 where the logic determines whether a "Me Too" icon included with the message has been selected by the user. If the logic determines that the "Me Too" icon has not been selected, the logic may move to block 154 where the logic ends. However, if the logic determines that the "Me Too" icon has been selected at diamond 152, the logic instead moves to block 156 where the logic may transmit/return a response message to the sender indicating the user's desire to, e.g., also purchase the item specified in the message or otherwise participate in the online activity specified in the message.

In the exemplary embodiment currently described, it is to be understood that selection of the Me Too icon may cause other things to occur responsive to its selection. For instance, a recipient may wish to purchase the item from an E-store such as Amazon.com specified in the Me Too message. Thus, selection of the Me Too icon in this context may, e.g., automatically cause an Amazon.com purchase web page to be presented on the recipient's CE device so that the recipient may purchase the item for the sender of the message. Accordingly, the Me Too message sent to the recipient may also include other information about the sender, such as the sender's address, telephone number, etc., to facilitate quick and easy purchasing of the item by the recipient.

As but another example, selection of the Me Too icon by the recipient may automatically cause a Me Too message and/or post to be presented on a Me Too platform/service (or other social networking application) such that it is viewable by more people than the sender and recipient, and indicates that the recipient wishes to buy the item for the sender at a later time, or otherwise approves of the sender's desire to purchase the item.

Accordingly, if desired, at block 156 the message sent from the recipient's CE device may also be sent to other people, e.g., using the "Me Too" application in accordance with present principles. Also if desired, the user may be prompted with and select an emoticon to be included in the response message.

As an aside, note that Me Too icons and the principles described herein may also be use in the video gaming context and presented on video game screens similar to how the present application describes presenting Me Too information on social networking sites such as Facebook and Twitter.

Figure 6:
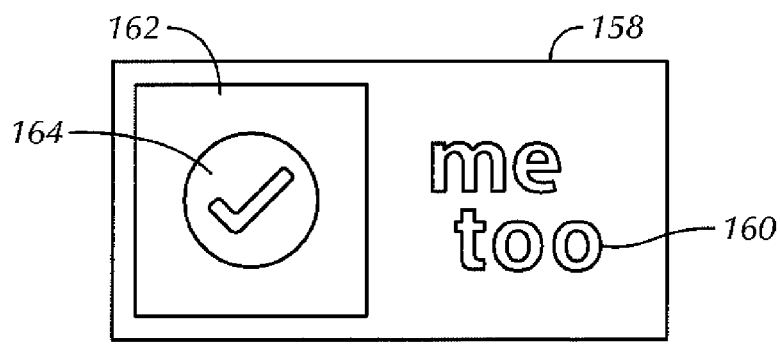
FIG. 6 depicts an exemplary Me Too icon.

Now in reference to FIG. 6, an exemplary Me Too icon 158 that may be used in accordance with present principles is shown. The icon 158 is a copyright of Sony Corporation 2012 by virtue of this declaration. The Me Too icon 158 optionally includes text 160. The icon 158 also includes a check box 162 that is selectable to provide input to a CE device processor indicating that the Me Too icon has been selected in accordance with present principles. Accordingly, when selected, a check mark 164 may appear in the box 162.

Figure 7:
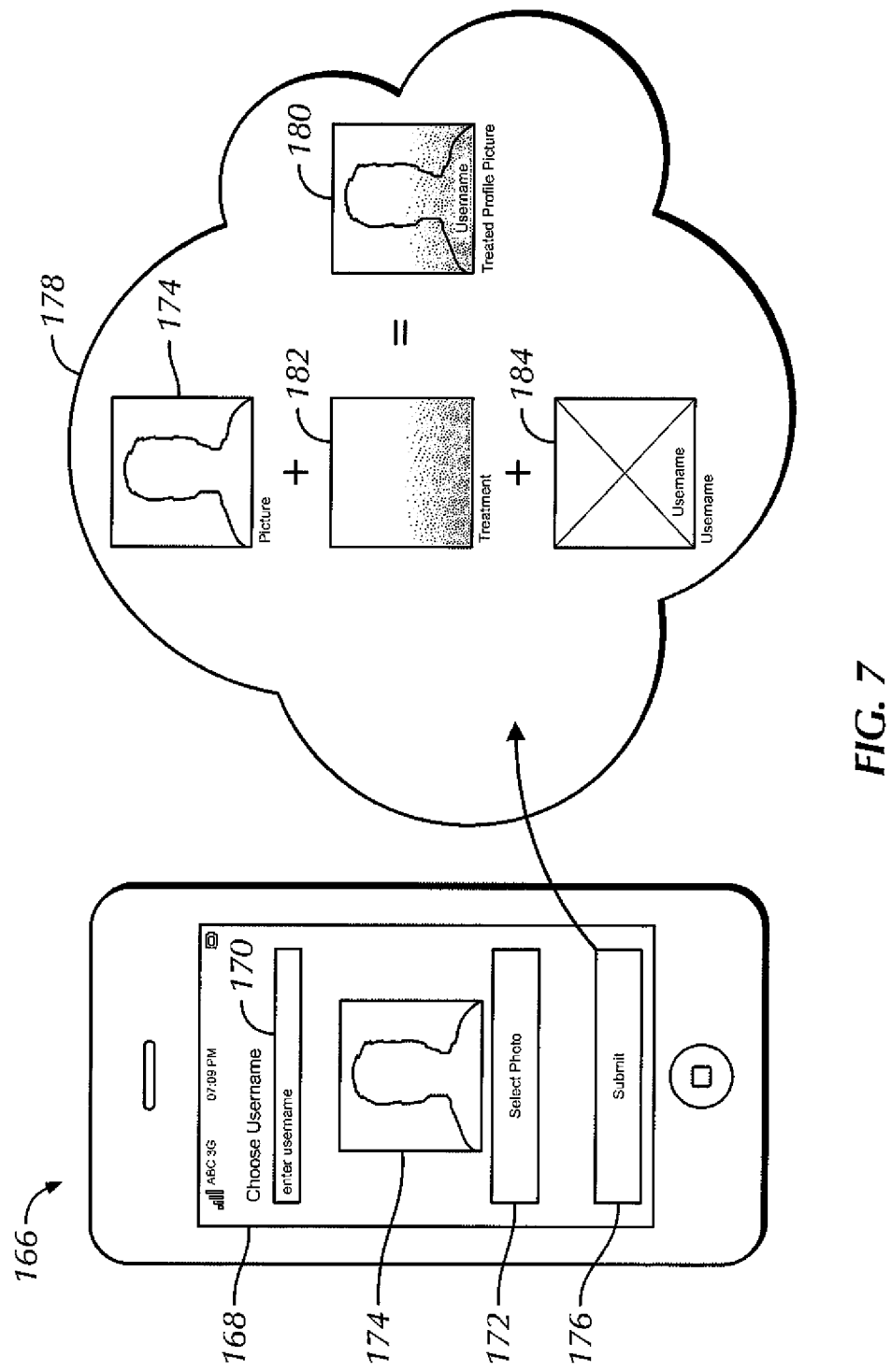
FIG. 7 is an exemplary diagram for creating/selecting a who icon.

Now in reference to FIG. 7, an exemplary diagram for creating a who icon to be selected in accordance with present principles is shown. It is to be understood that creating and/or modifying a who icon, as well as any of the other icons as described herein, may be done in accordance with the logic set forth herein. For example, creating a who icon as will be immediately described may form part of the logic performed at block 84 of FIG. 2.

Accordingly, FIG. 7 shows a CE device 166. In the exemplary embodiment shown, the CE device 166 is a smartphone. CE device 166 presents a UI 168 which may be manipulated by a user to create/select/modify a who icon. Thus, a username entry box 170 may be presented on the UI 168 to allow the user to enter a desired username or screen name to accompany and/or be overlaid on the who icon. The UI 168 also includes a select photo selector 172 that may cause, e.g., another UI or a pop-up box to be presented on the device 166 from which a photo/image 174 may be selected.

A submit selector 176 is also shown on the UI 168 so that, once a photo/image has been selected and the UI 168 is again presented on the device 166, the username and photo may be combined by the processor of the device 166 as illustrated by the cloud 178 to generate a who icon 180 as shown. Note that a "treatment" element 182 is also shown, denoting that certain image effects that may have been specified by a user may also be used to produce the icon 180. For instance, a fade effect or other photo shop-type manipulations may be specified by the user. Last, a username element 184 is shown and illustrates that the username entered at box 170 is also combined to produce the icon 180. Note that although the who icon creation presently described (or any other icon selection/creation/modification described herein) is disclosed as being created/modified/selected at the CE device 166 which may then sent to a server to be forwarded to a recipient, all or part of the logic to create such an icon may be executed by a server as well, including a Me Too server hosting a Me Too platform/service.

Figure 8:
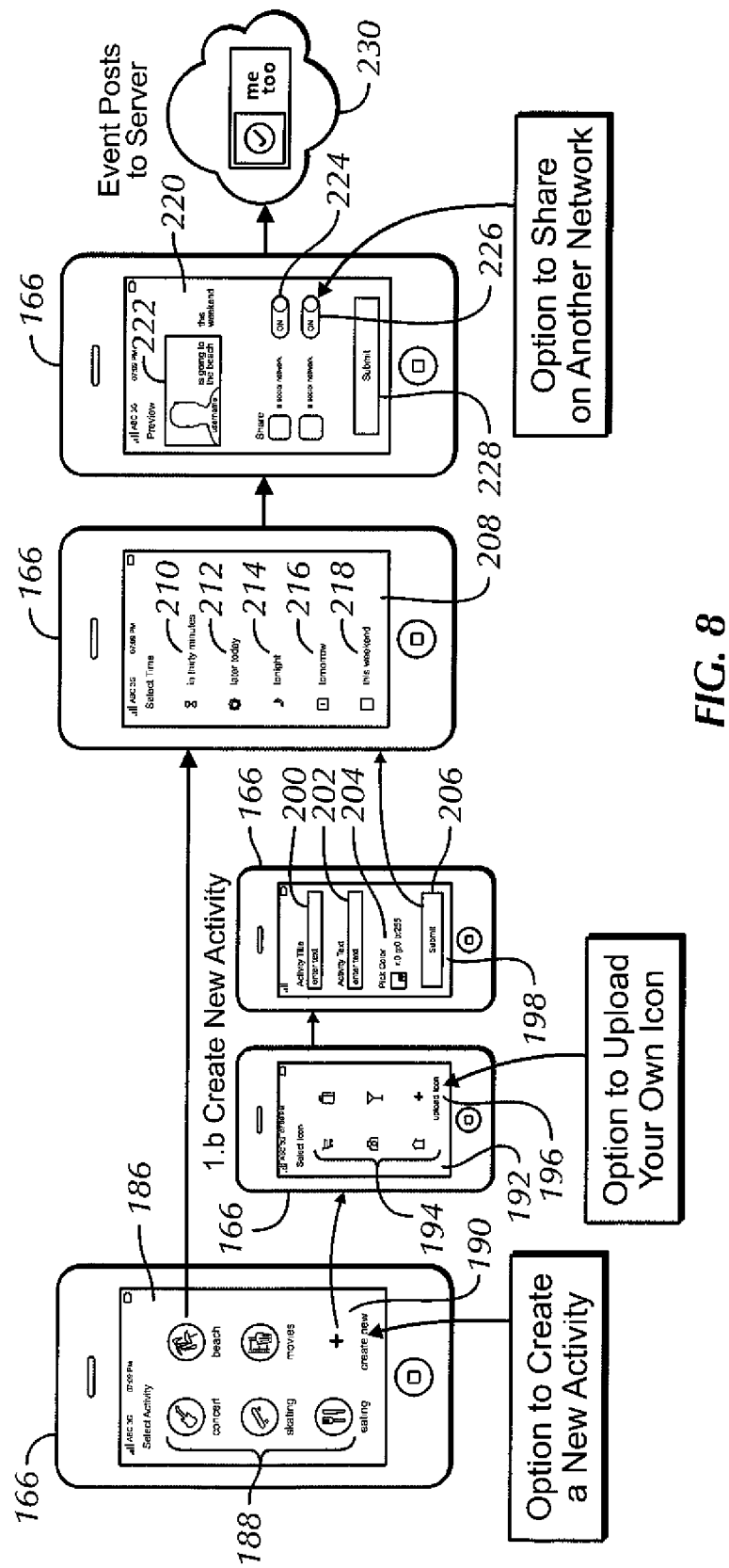
FIG. 8 is an exemplary diagram for creating/selecting what and when icons.

Moving on, reference is now made to FIG. 8. FIG. 8 again shows the device 166, this time with a what UI 186 presented thereon. The UI 186 facilitates creation of a what icon in accordance with present principles, and may be presented on the device 166 after the who icon has been created as described above. Thus, the UI 186 includes plural activity icons 188 that includes an image and optionally also includes alpha-numeric language corresponding to the image. The UI 186 also includes a "create new" selector 190 that, when selected, causes the UI 192 to be presented on the device 166 as shown.

The UI 192 includes plural images 194 that are selectable and/or combinable with each other to form part of the what icon to be created. UI 192 also shows an upload icon selector 196 which may be selected after at least one of the images 194 has been selected to cause the at least one image to be used by the processor of the device 166 to create the icon. Thereafter, a UI 198 also shown in FIG. 8 may subsequently be presented on the device 166. The UI 198 includes an activity title box 200 where a user may input a desired title to correspond to the image for an activity selected from the UI 192. An activity text box 202 is also shown, which allows a user to input additional text regarding the activity to be included with the what icon being created. If desired, the UI 198 may also include an icon presentation parameter selector 204 that allows a user to select certain presentation parameters for the icon, e.g., by causing another UI not shown to be presented on the device 166. The parameters may include things such as color, fade, 3D, etc. Note that the UI 198 also shows a submit selector 206 to submit the user's selections to the processor of the device 166 in accordance with present principles to thereby create the what icon.

Still in reference to FIG. 8, responsive to the submit selector 206 being selected to thus cause a new what icon to be created, or responsive to one of the what icons being selected from the UI 186, a UI 208 may be presented on the device 166. The UI 208 prompts a user to select a time for when the user intends to participate in the activity or event reflected by the what icon previously selected. Note that as shown, the UI 208 does not include a precise time of day such as, e.g., 10:19 a.m. Instead, the UI 208 includes selectors for more general times of day and/or future days, although it is to be understood that precise times of day may also be presented on the UI 208, either exclusively or in combination with more general times. Accordingly, the UI 208 includes an "in thirty minutes" selector 210, a "later today" selector 212, a "tonight" selector 214, a "tomorrow" selector 216, and a "this weekend" selector 218. It is to be understood that still other times may be included, such as, e.g., "next week," "next weekend," "next month," "in two months," "next year," etc.

Even further, present principles recognize that the Me Too app may be used to display past events to friends of a user should the user simply wish to inform his or her friends/family of what the user has done in the past. So, for instance, the user of the device 166 may create a Me Too entry for a concert that the user recently attended, and hence the UI 208 may in some embodiments include a general past times to be used with a concert what icon. For example, a "yesterday" or "last week" selector may be presented on the UI 208 either in combination with the future general times, or in a separate UI and/or logic flow/process specifically for creating past events. Moreover, once such a past event has been created, a Me Too icon may be presented on the friends' devices using their Me Too apps such that, e.g., a friend of the user of the device 166 may select the Me Too icon to show their community of friends that they both attended a concert yesterday.

Continuing the description of FIG. 8, after one of the selectors 210-218 is selected, either a "submit" selector (not shown) may be selected to cause the UI 220 to be presented, or the UI 220 may be presented automatically responsive to one of the selectors 210-218 being selected. Either way, FIG. 8 shows that the device 166 then presents the UI 220, which is a preview of the Me Too event and/or icon being created and about to be published/distributed/posted to the user's friends and family. Note that at the top of the UI 220, the who icon, what icon, and when icon have been combined to create a unified banner-like icon 222, although it is to be understood that they may also be presented such that they are spaced apart from each other. Also note that the UI 220 lists other social networks and/or applications on which the Me Too application is configured to publish/post the activity through, e.g., linking the user's Me Too account with the user's Facebook and Twitter accounts. Thus, selector 224 may be selected to turn Facebook sharing of the activity on or off, and likewise selector 226 may be selected to turn Twitter sharing of the activity on or off.

Note that when the activity is published, shared, etc. on Facebook and/or Twitter, the icon 222 may be shown on those services just as it appears on the UI 220. However, the content and/or data reflected in the icon 222 may also be published in other ways on other social networking services, such as, e.g., in plain text. Manipulating the data represented on the icon 222 to present it in another form may be done by the Me Too app prior to sending the data to the other service, and/or may be done by the service itself upon receiving the icon 222.

Still in reference to the UI 220, note that it also includes a submit button 228 which, when selected, publishes and/or otherwise transmits the icon/message 222 to contacts of the user, where those contacts may be selected and/or predetermined as set forth above. Should either of the selectors 224 or 226 be set to the on position, selection of the submit button 228 also causes the icon 222 and/or data reflected by the icon 222 to be published on those services as well. As FIG. 8 shows, the device 166 may transmit such icons/information/messages by sending it to a server represented by cloud 230 in FIG. 8 that may be, e.g., a designated Me Too server for supporting a Me Too social networking service accessible over a wide area network such as the Internet. However, it is to be understood that any of the messages disclosed herein may also be transmitted from one device to another over, e.g., a wireless telephone network without having the message be transmitted through, e.g., an Internet server.

Note that in addition to the foregoing, the UIs described in reference to FIGS. 7 and 8 may also include, e.g., a question mark selector which may be selected to change a title or caption associated with an icon. Thus, for instance, a user may wish to use a certain image presented on the 186 when creating/using a what icon, but wish to change only the caption included therewith.

Figure 9:
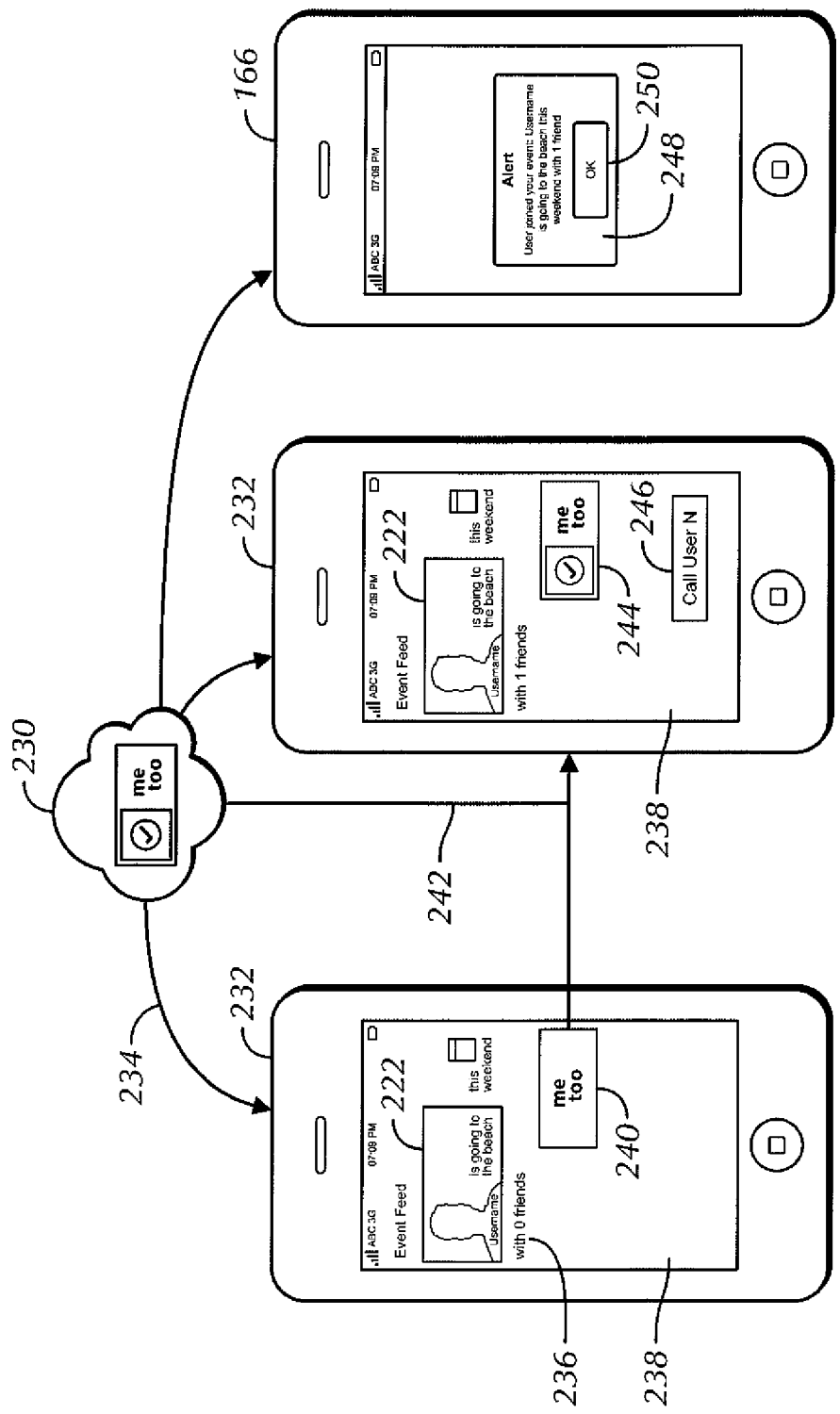
FIG. 9 is an exemplary diagram illustrating a Me Too activity icon being sent to another CE device.

Reference is now made to FIG. 9, which shows the Me Too message/icon 222 being transmitted at least to another CE device 232 (e.g., of the user's friend) from the Me Too server 230 after the server 230 has received it from the device 166. It is to be understood, however, that the message may be pushed to any and/or all devices associated with people connected to the creator of the activity, e.g., through a Me Too social networking service as described herein. Thus, anyone who is connected to the creator of the activity can view the post (e.g., the icon 222) on their device and/or be notified accordingly.

As indicated by arrow 234, the message/icon 222 is transmitted to the device 232, which presents it on a UI 238. It may be presented automatically without user interaction upon receipt at the device 232, and/or a notification may be presented on the device 232 notifying the user of the device 232 that a Me Too message is waiting to be viewed. Note that an indication 236 notifies the user of the device 232 that no one other than the creator of the activity has indicated they will join in the activity with the creator. The UI 238 also includes a Me Too icon in accordance with present principles that is selectable to cause the device 232 to transmit an accept and/or join message back to the server 230 so that the server 230 may then forward the accept/join message back to the device 166 indicating that a contact to which the icon 222 was sent will join in the activity, as indicated by arrow 242. As also shown in FIG. 9, the icon 240 changes to include a check mark 244 reflecting that the user of the device 232 will be joining in the activity. The indication 236 also changes to reflect that at least one friend—in this case, the user of the device 232—will be joining in the event. Note that although the present figure is being described as though the UI 238 changes to reflect information responsive to the icon 240 being selected, note that a separate UI may instead be presented similarly reflecting what is described above in other embodiments.

Regardless, note that a selector 246 is also presented responsive to the Me Too icon 240 being selected. The selector 246 may be selected to cause the device 232 to call the device 166 associated with the creator of the activity so that, e.g., the two users can better coordinate their meet up for the activity (e.g., to meet at a particular part of a park or structure). Accordingly, in some embodiments the message/icon 222 may include the sender's telephone number to facilitate the call responsive to selecting the selector 246.

Continuing in reference to FIG. 9, note that the server 230 may forward a new message and/or the accept message described above to the device 166 responsive to the Me Too icon 240 being selected to thereby notify a user of the device 166 that the friend is joining in the activity. Thus, as shown the device 166 may present a pop-up alert 248 indicating that one friend will be participating in the activity with the user of the device 166. An "ok" selector 250 is also shown, which when selected causes the alert 248 to cease being presented on the device 166.

Figure 10:
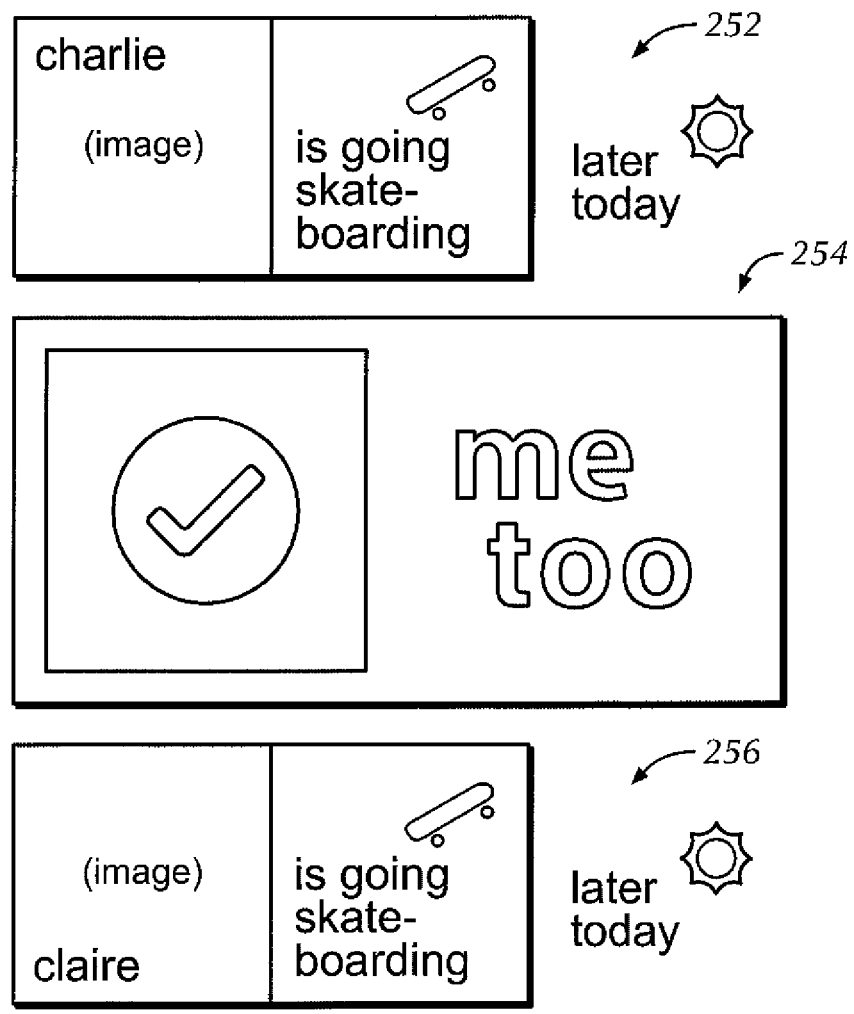
FIG. 10 shows exemplary icons to be used in accordance with present principles.

Moving on to FIG. 10, exemplary icons to be used in accordance with present principles are shown. Thus, an icon 252 indicates that a Me Too user named Charlie is going skateboarding later today. A Me Too icon 254 may be selected by another Me Too user such as Claire. Responsive to the Me Too icon 254 being selected by Claire when viewing Charlie's activity, an icon 256 for Claire may also be created and, e.g., pushed to Claire's friends and/or published/posted on a social network indicating that Claire is also going skateboarding later today. In some embodiments, the creation of the icon 256 may be done automatically without further user action by Claire responsive to her selecting the icon 254 on her CE device.

Figure 11:
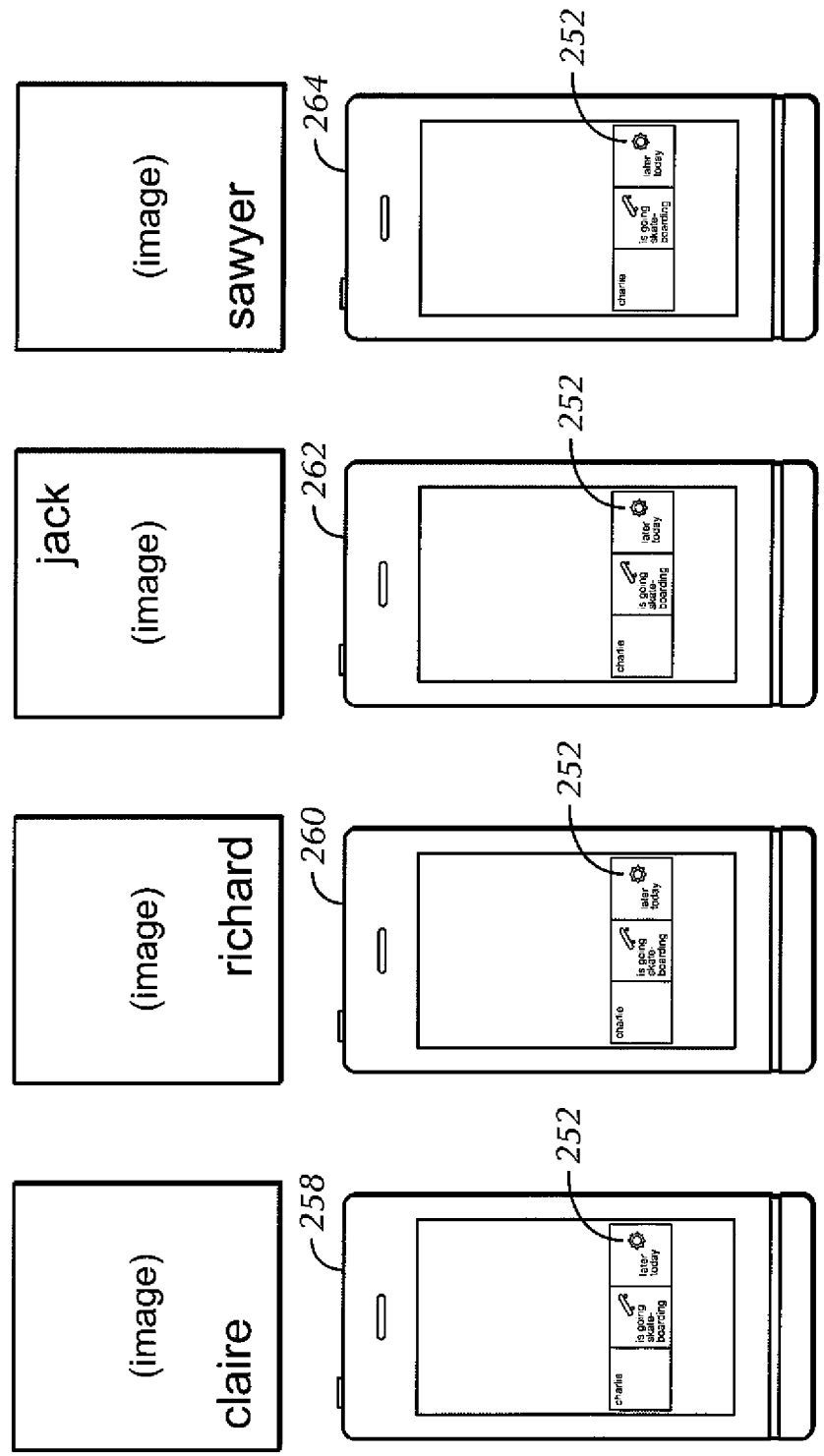
FIG. 11 is a diagram of plural CE devices receiving an activity icon.

FIG. 11 illustrates that the icon 252 may be pushed to plural CE devices once created by Charlie, where each CE device is associated with a different contact of Charlie's. Thus, Claire's CE device 258 receives the message/icon 252 and presents it thereon, as does Richard's CE device 260, Jack's CE device 262, and Sawyer's CE device 264. Assuming that all four of Claire, Richard, Jack, and Sawyer wish to join in Charlie's Activity, the icon 252 as presented on Charlie's CE device (or alternatively a new icon similarly reflecting the information of the icon 252) now indicates that four friends will be joining in the event. If desired, the portion of the icon 252 indicating that four friends are joining may be selectable to cause Charlie's CE device to show the specific contacts that are participating (e.g., by showing who icons associated with Claire, Richard, Jack, and Sawyer).

Figure 12:
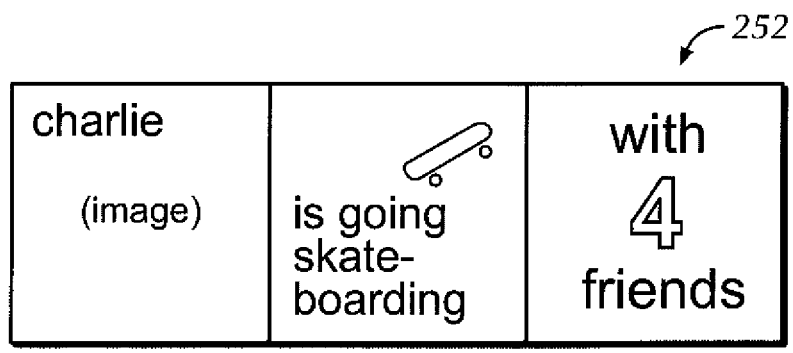
FIGS. 12 and 13 are illustrations of exemplary activity icons indicating the number of users participating in an activity.
Figure 13:

Rather than changing the icon 252 as shown in FIG. 12 to reflect that four friends will be joining Charlie, a new icon/message 266 as shown in FIG. 13 may be created and presented in accordance with present principles (e.g., by the server 230 once receiving Me Too icon selections from Claire et al.) for presentation on Charlie's CE device. Thus, as may be appreciated from FIG. 13, the icon 266 includes the wording "me too" with a check mark that resembles the Me Too icons described above, as well as an indication that five friends will be joining Charlie in his activity.

Continuing the detailed description in reference to FIGS. 14-16, exemplary who icons are shown in FIG. 14, exemplary what icons are shown in FIG. 15, and exemplary when icons are shown in FIG. 16. It is to be understood that all of the icons shown in FIGS. 14-16 are selectable in accordance with present principles. Note that other what icons besides those shown in FIG. 15 may be used in accordance with present principles, such as, e.g., activity icons for a wedding, a birthday, graduation, holidays, etc. Note that FIG. 16 shows a "someday" what icon 268 that may be selected to indicate a Me Too user wishes to participate in an activity at an unspecified, possibly unknown, future time.

Figure 17:
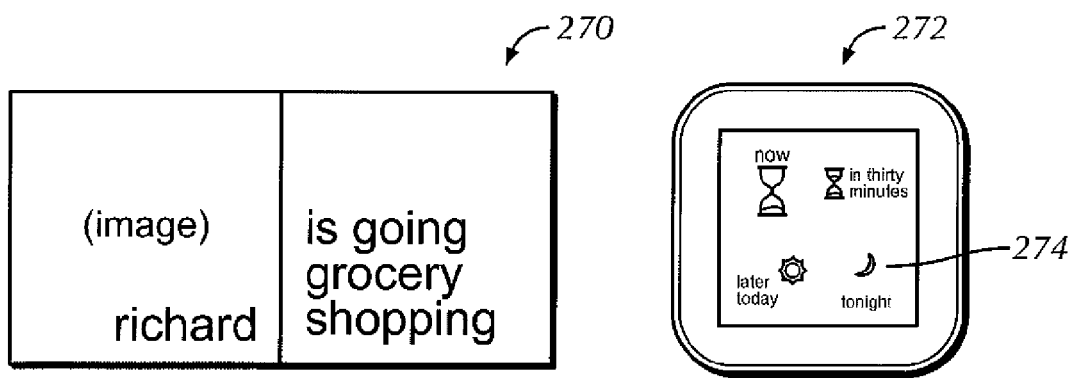
FIGS. 17-19 are exemplary diagrams illustrating how Me Too messages facilitate communication between two CE device users.
Figure 18:
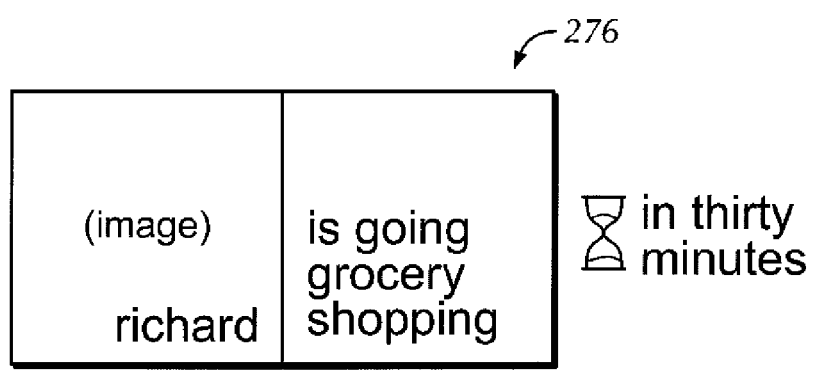

Turning now to FIG. 17, an exemplary Me Too message/icon 270 is shown. It indicates that a user, Richard, is going grocery shopping. FIG. 17 also shows a smart watch 272 manufactured by Sony Corporation that is manipulable by Richard to create the message/icon 270. Note that as shown, the message/icon 270 thus far only includes a who icon and a what icon, and that the smart watch 272 is presenting a UI 274 for Richard to select a when icon to be included in a completed Me Too activity message/icon. FIG. 18 thus shows a completed icon 276 for Richard's activity that may be created once Richard selected a when icon from the UI 274.

Figure 19:
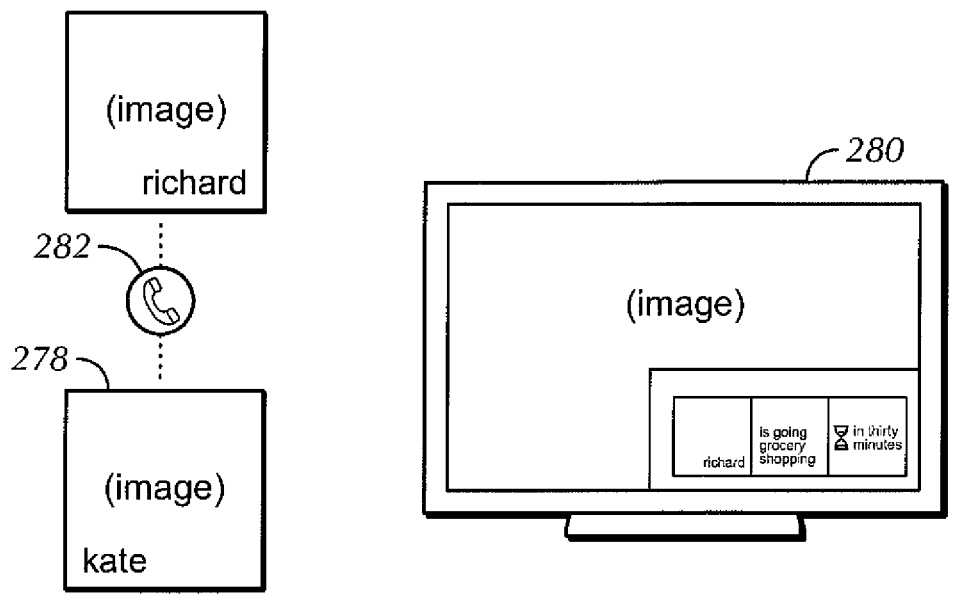

As may be appreciated from FIG. 19, the icon 276 may then be transmitted to, e.g., a user named Kate associated with a who icon 278. Kate's smart TV 280 may thus present the icon 276. As shown in FIG. 19, upon viewing the icon 278 on the TV 280, Kate calls Richard as indicated by the telephone icon 282 to, e.g., request that Richard pick up something for her while at the grocery store (which is the activity in which Richard will be participating).

Figure 20:
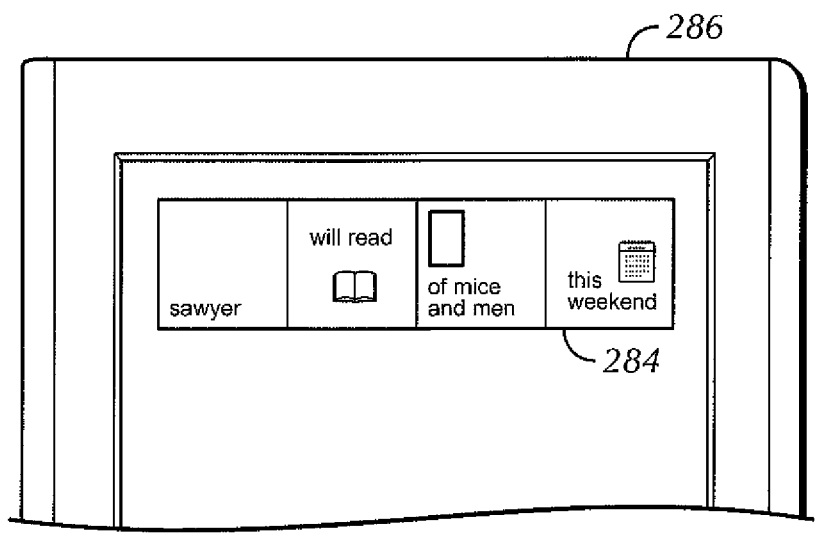
FIG. 20 is an illustration of an exemplary Me Too activity icon presented on a tablet computer.

Now in reference to FIG. 20, yet another exemplary Me Too activity icon/message is shown. A Me Too activity icon 284 is thus presented on a tablet computer 286. The icon 284 indicates that a user named Sawyer will read the book Of Mice and Men this weekend.

Figure 21:
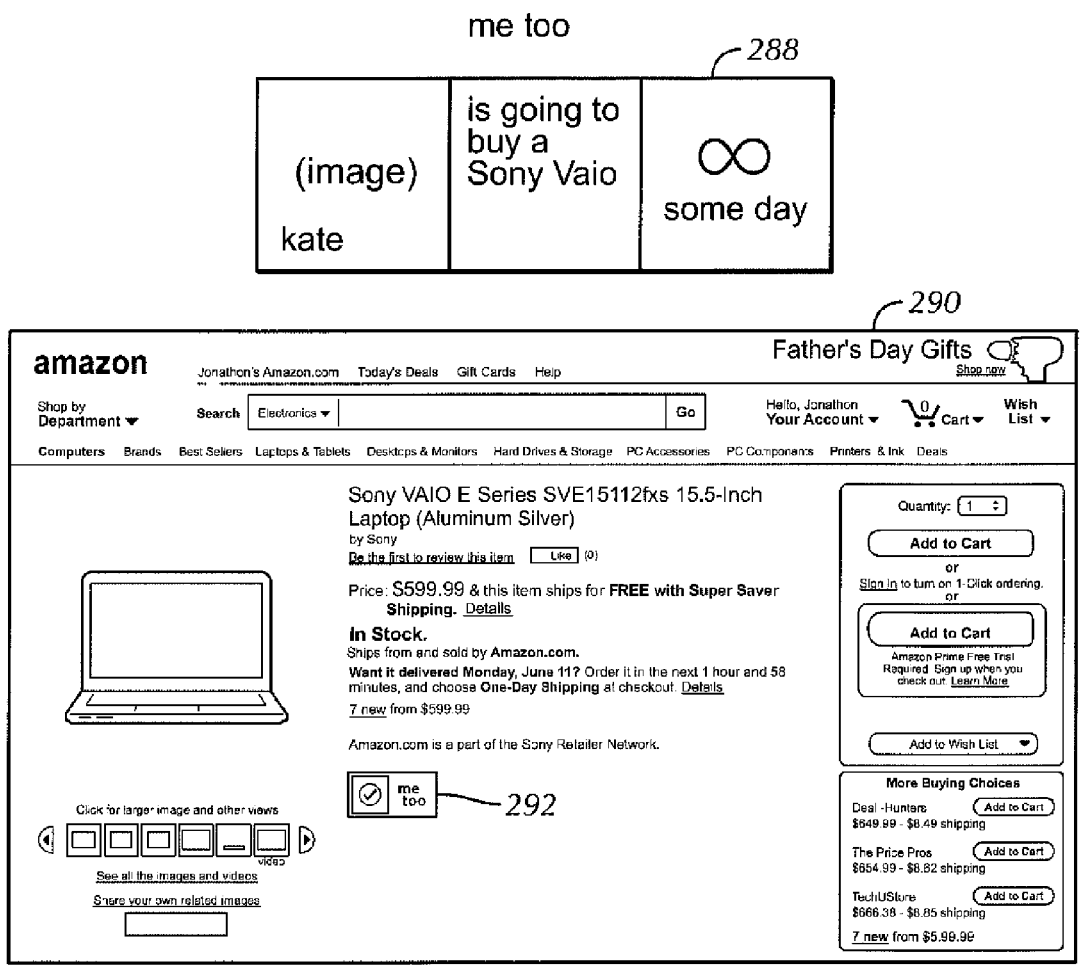
FIGS. 21 and 22 are exemplary webpages of an E-store with a Me Too icon on the webpage.

Yet another exemplary Me Too activity icon/message is shown in FIG. 21. FIG. 21 shows an activity icon 288 indicating that a user named Kate wishes to buy a Sony Vaio computer "some day" in the future. FIG. 21 also shows an Amazon.com webpage 290 showing the Sony Vaio computer for sale that Kate wants. It is to thus be understood that should Kate's activity icon 288 be selected by one of her contacts on that contact's CE device, the CE device of that contact may cause the web page 290 to be presented so that the contact can view the computer Kate wants. Note that a Me Too icon 292 is also shown on the web page 290. The icon 292 may be selected by Kate to initiate a process to create the icon 288, and, e.g., when viewed on the CE device of Kate's contact can be selected by the contact to cause an icon to be created to reflect that the contact also wants the same product.

Figure 22:
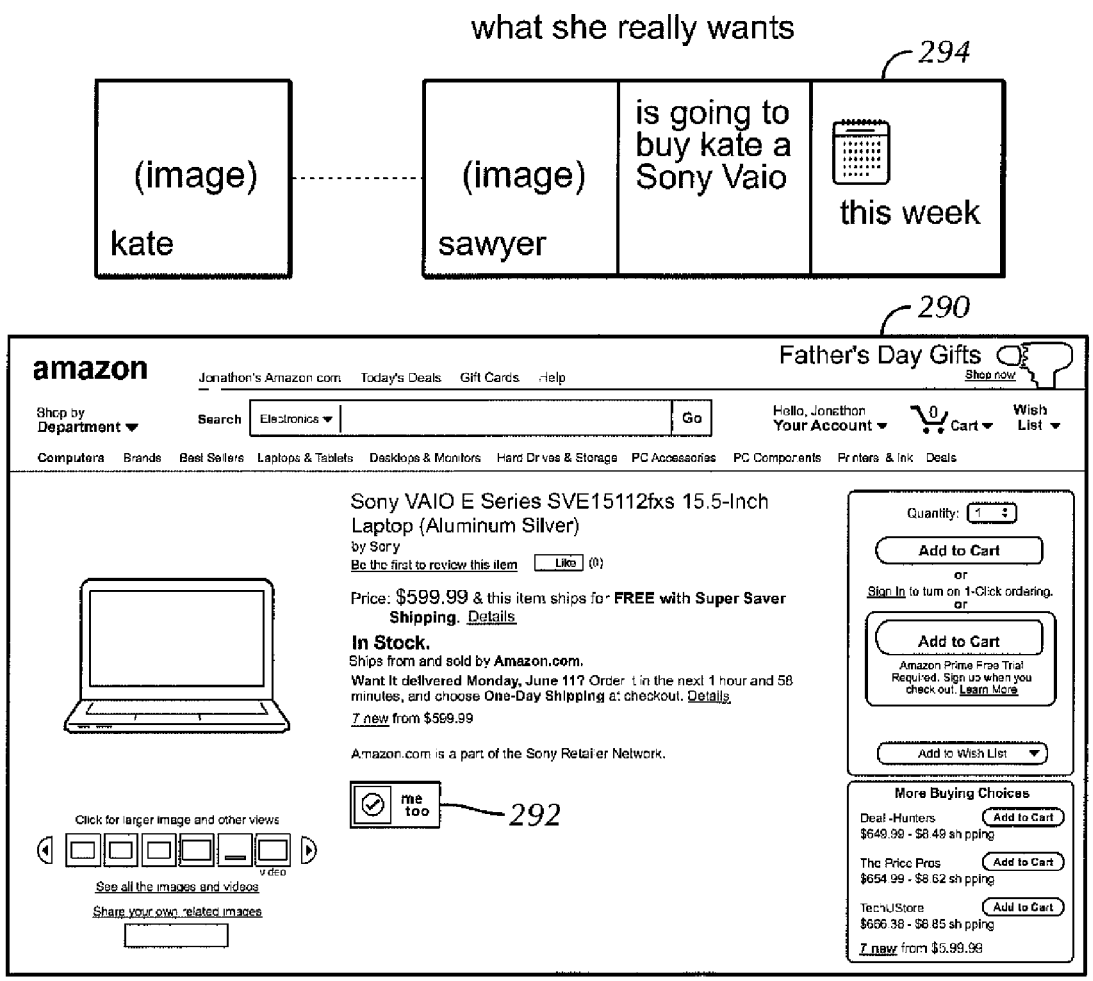

Furthermore, as appreciated from FIG. 22, Kate's contact Sawyer may view the web page 290 and decide he wishes to buy Kate the computer she wants. Thus, Sawyer may select the Me Too icon 292 as presented on his device to create an activity icon 294 indicating that Sawyer will be participating in the activity of buying Kate a Sony Vaio computer this week.

Figure 23:
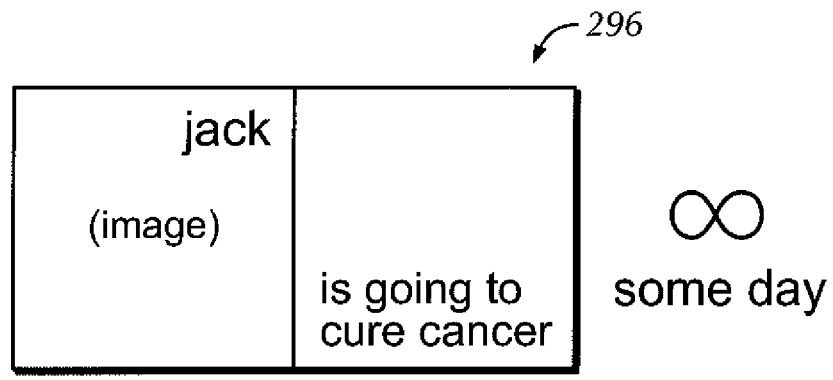
FIGS. 23 and 24 show additional exemplary Me Too activity icons.
Figure 24:
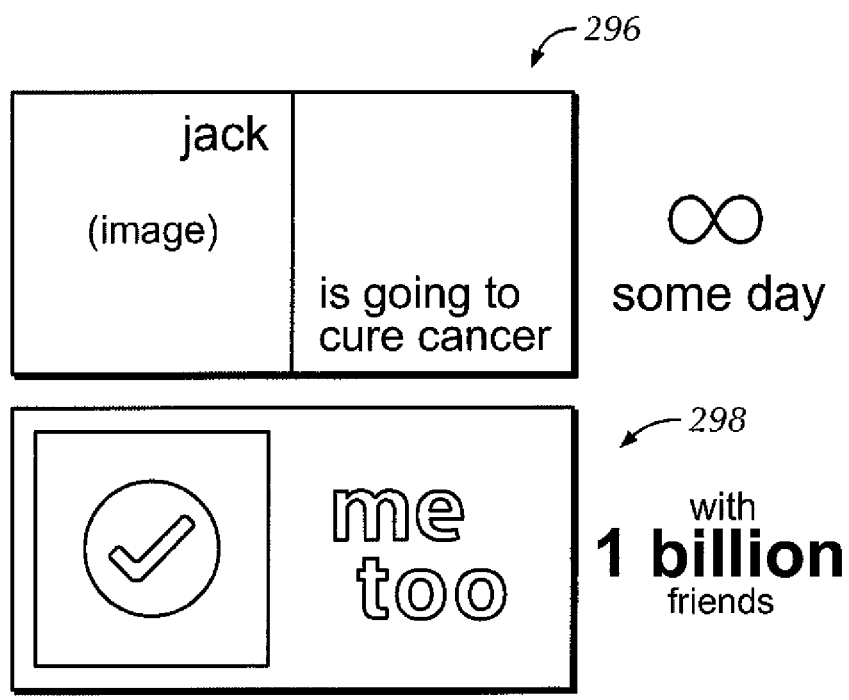

As another example, FIG. 23 shows another exemplary activity icon. The icon 296 indicates that Me Too user Jack will be curing cancer some day. Then, as shown in FIG. 24, Jack's activity is joined by one billion users as reflected by icon 298.

Figure 25:
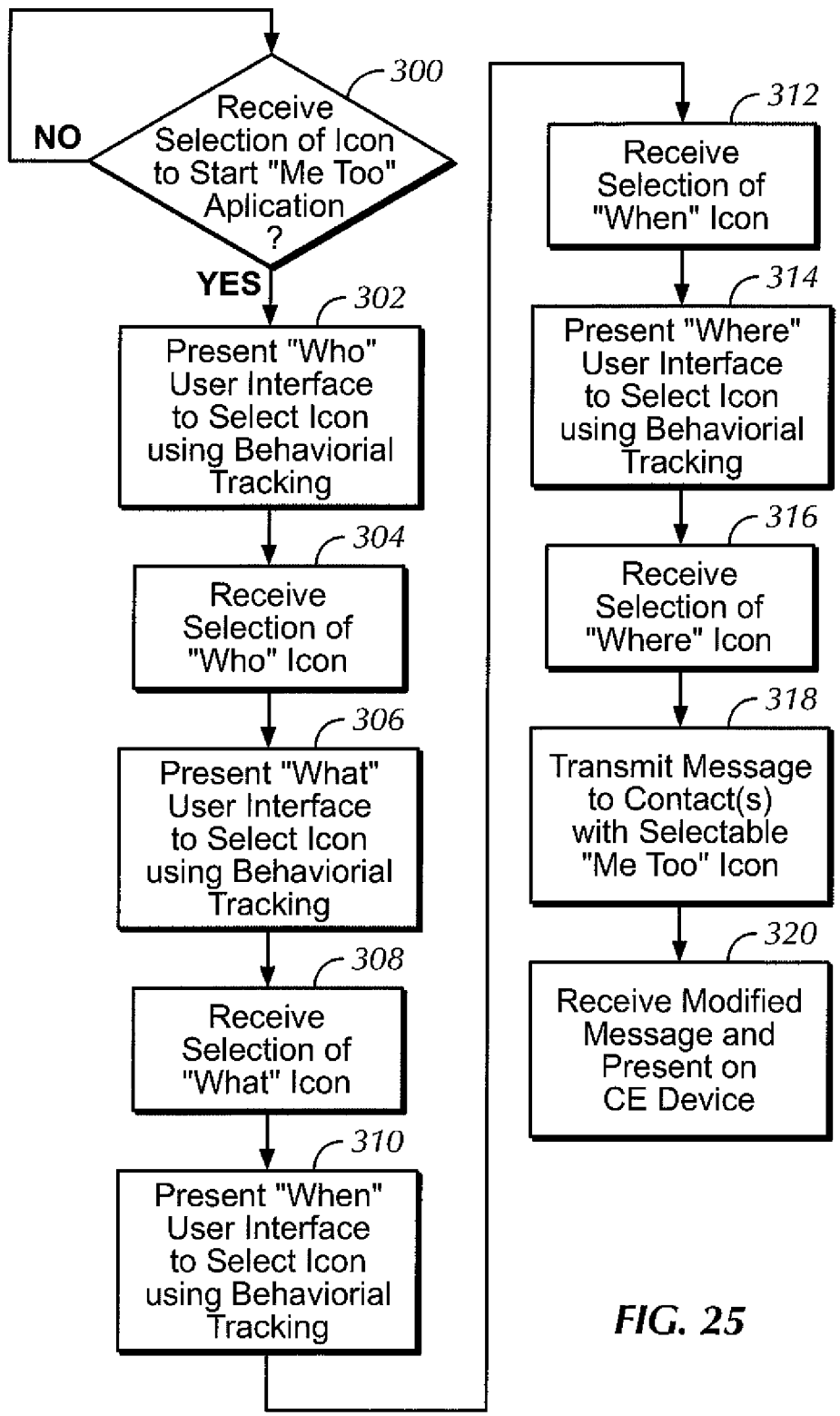
FIG. 25 is a flow chart of example logic for sending a "Me Too" message from a sending CE device using behavioral tracking.

Turning to FIG. 25, a flow chart of example logic for sending a "Me Too" message from a sending CE device using, e.g., a "Me Too" application or "Me Too" social networking service in accordance with present principles is shown, this time with the logic utilizing behavioral tracking. Beginning at decision diamond 300, the logic determines whether it has received a user's selection of a "Me Too" icon, and/or input to launch a "Me Too" application and/or process. If the logic determines no such selection has been received, the logic may loop back around and continue making the determination at diamond 300 until such time as an affirmative determination is made.

After making an affirmative determination at diamond 300, the logic proceeds to block 302 where the logic presents a "who" user interface (UI) from which a user may select an associated icon in accordance with present principles using, e.g., behavioral tracking as discussed further below. After receiving the "who" icon selection at block 304, the logic then moves to block 306 where the logic presents a "what" user interface (UI) in accordance with present principles from which a user may select an event, activity, etc., in which the user wishes to participate using, e.g., behavioral tracking. The "what" selection is then received at block 308.

Thereafter, the logic proceeds to block 310 where the logic presents a "when" UI from which a user may select, e.g., a general and/or approximate time of day for when the user intends to participate in the event or activity in accordance with present principles using, e.g., behavioral tracking. The logic then receives the "when" selection at block 312 and proceeds to block 314.

At block 314 the logic presents a "where" UI from which a user may select, e.g., a place or location where the user intends to participate in the event or activity using, e.g., behavioral tracking. For instance, the place could be somewhere relatively more general like a particular city or state (e.g., San Diego or California), or somewhere relatively more specific like a particular street address, a shopping center, a restaurant, etc. The logic then receives the "where" selection at block 316 and proceeds to block 318.

At block 318 the logic processes the user selections, creates a message including the icons and/or information input by the user, and transmits the message to one or more of the user's contacts or friends in accordance with present principles, and the message may also include, e.g., a selectable "Me Too" icon in the message. The logic then proceeds to block 320 where the logic may receive back and present a message regarding the activity that has been modified by, e.g., a friend of the user as described more fully immediately below (it being understood that, e.g., in addition to or in lieu of the foregoing, such messages may be presented in the form of social networking posts that are, e.g., presented in a feed of posts viewable by a person once logged into the social networking service).

Figure 26:
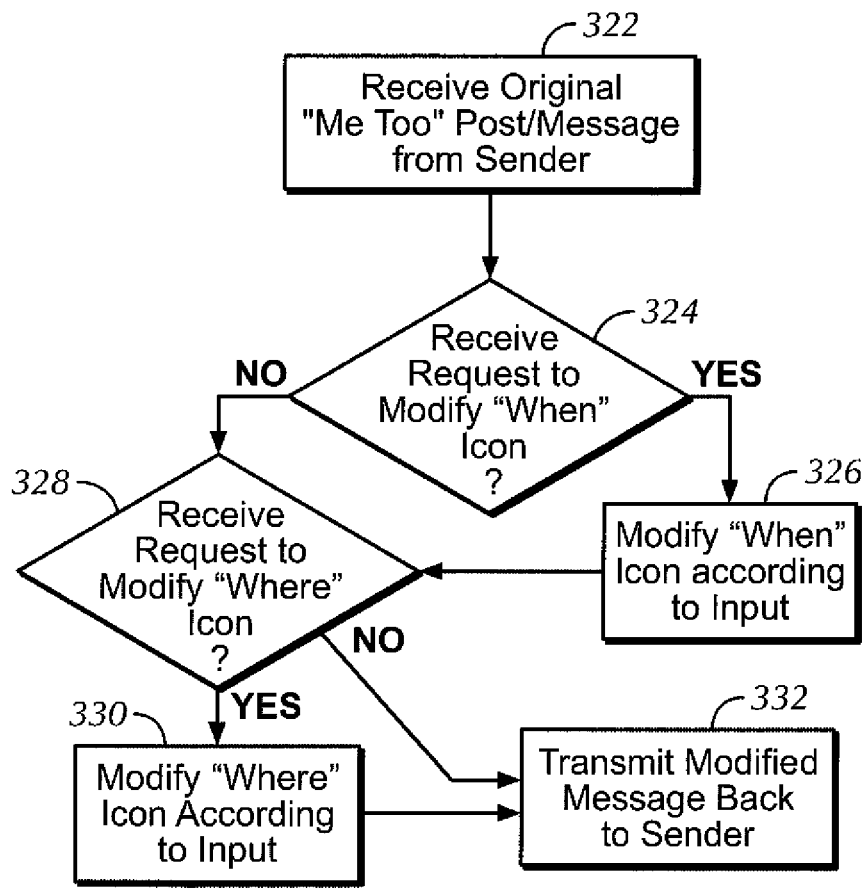
FIG. 26 is an exemplary flow chart of logic for modifying at least one icon for some one else's original Me Too message.

Accordingly, reference is now made to FIG. 26, which is an exemplary flow chart of logic for modifying at least one icon for some one else's original Me Too message and/or post (e.g., a friend's post) that may have been created, e.g., according to the logic of FIG. 25. Thus, present principles recognize that the icons disclosed herein are modifiable based on input from at least one friend of the user (e.g., a recipient of the message) that sent the "original" message (e.g., a social networking post). Present principles also recognize that original messages/posts are themselves modifiable such that the content/icons of the message created by one user may be changed or modified by another user rather than, e.g., simply adding more data to the post by commenting on and/or replying to the post using a comment or reply function. Thus, at least some of the icons of a post, and/or data and information associated therewith, may be replaced by a user that did not initially create the post.

Beginning with block 322, the logic of FIG. 26 receives and/or presents an original Me Too post that was created by another person (e.g., a "sender"). Then at decision diamond 324 the logic determines whether a request has been received to modify a when icon that has been received/presented. If the logic determines that a request to modify the when icon has been received, the logic proceeds to block 326 where the logic modifies the when icon according to received input (e.g., responsive to an affirmative determination at decision diamond 324, the logic may present a user interface presenting icons that are selectable to modify the message/post in accordance with present principles and then receive a selection from the UI to thereby modify the when icon). The logic then moves to decision diamond 328, it being understood that if a negative determination was made at diamond 324, the logic skips block 326 and proceeds directly to diamond 328.

Either way, at diamond 328 the logic determines whether a request has been received to modify a where icon representing a location has been received/presented. If the logic determines that a request to modify the where icon has been received, the logic proceeds to block 330 where the logic modifies the where icon according to received input (e.g., responsive to an affirmative determination at decision diamond 328, the logic may present a user interface presenting icons that are selectable to modify the message/post in accordance with present principles and then receive a selection from the UI to thereby modify the where icon). The logic then moves to block 332, it being understood that if a negative determination was made at diamond 328, the logic skips block 330 and proceeds directly to diamond 332.

At block 332, the logic transmits the modified message back to the person that initially created the message, modifies a feed including the message to reflect the modification, and/ or reposts the message to reflect the modification. Before moving on to the description of FIG. 27, it is to be understood that the other icons described herein (e.g., the who and what icons) may be similarly modified.

Figure 27:
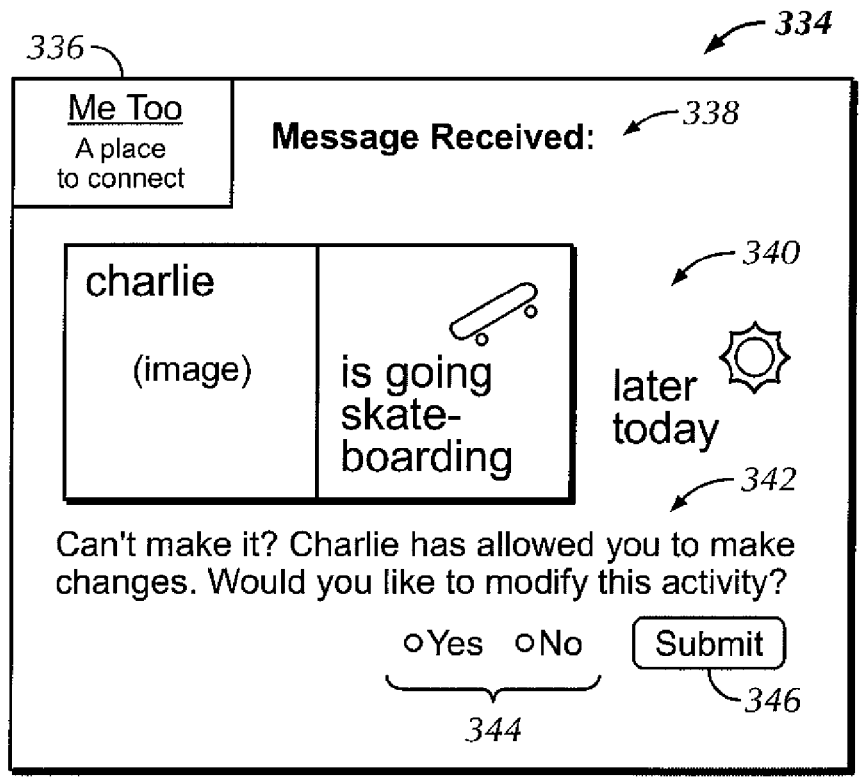
FIG. 27 is an exemplary user interface (UI) useable to initiate a modification to an original post.

An exemplary user interface (UI) 334 that may be used to initiate a modification to an original post in accordance with present principles is shown in FIG. 27. The UI 334 includes an exemplary banner 336 presentable on any of the UIs disclosed in the present application. The banner 336 may contain information, slogans, catch phrases, logos, etc. of the "Me Too" social networking application/service. The UI 334 also includes an indicator 338 notifying a user of the Me Too service that a message has been received and/or is otherwise viewable through the user's social networking account and/or profile.

Thus, an exemplary message 340 including who, what, and when icons is presented on the UI 334. As may be appreciated from FIG. 27, the message 340 indicates that the user's social networking friend Charlie is going skateboarding later today. The UI 334 also includes exemplary text 342 below the message 340 (it being understood that the text 342 may be presented anywhere on the UI) that indicates that Charlie has approved the user to make changes to the original messages created by Charlie. As indicated above, making changes to an original message/post such as the message 340 may entail changing or replacing the content, icons, and information associated with the post Charlie created rather than, e.g., adding additional information or data through a reply post, comment post, or another addendum to Charlie's message and thereby leaving the portion of the message created by Charlie unaltered.

It is to be understood that a friend of the user (e.g., Charlie) may approve the user to make changes to the friend's original message, e.g., only if the user is included in an index, registry, and/or list of users determined by the friend to grant approval to modify original messages. Such an index will be described further below in reference to FIG. 33. However, present principles also recognize that approval may be granted to the public or to particular users only for a particular post or group of posts (e.g., all posts created on a particular day), and furthermore present principles recognize that individual requests may be made to the person that initially created the post to allow the requesting person to modify the post, e.g., on a per-post basis or such that the requesting person may be added to the index described herein automatically based on a grant of a request to modify posts that is sent to a user.

Still in reference to FIG. 27, adjacent to the text 342 are yes and no radio buttons 344 and a submit button 346 for a user to input a selection regarding whether to make changes to Charlie's post based on the prompt/text 342. If the yes radio button is selected and the submit button 346 is then selected, a UI 348 shown in FIG. 28 may be presented (e.g., by a processor on a CE device (executing logic in accordance with present principles) on which the user is using the social networking service, and responsive to selection of the submit button) or the radio buttons themselves.

Figure 28:
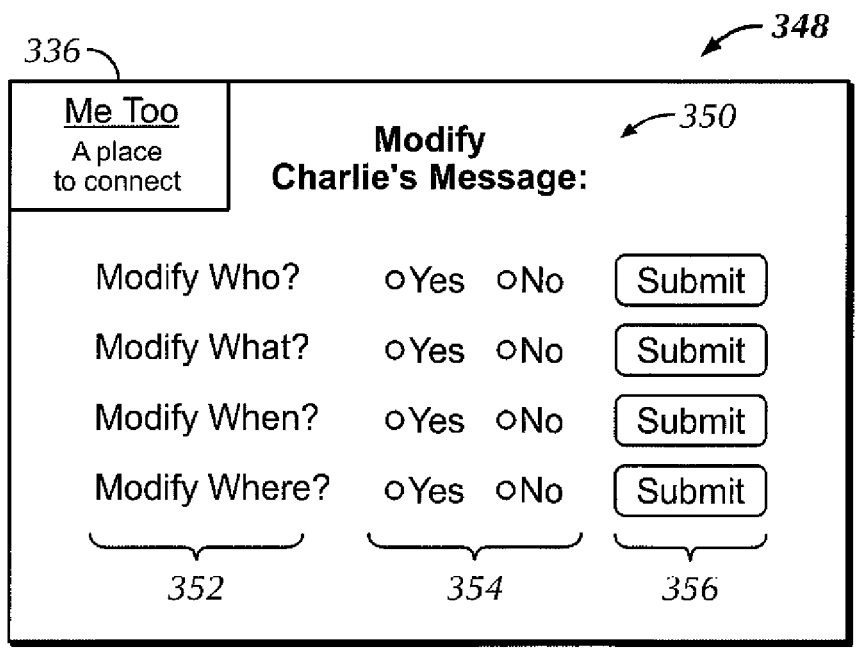
FIG. 28 is an exemplary UI for modifying various portions of a Me Too message.

Accordingly, the UI 348 of FIG. 28 includes an indicator 350 instructing the user to modify Charlie's original message. The UI 348 includes a category column 352 for each of the, e.g., who, what, when, and where icons associated with Charlie's message. The UI 348 also includes respective yes and no radio buttons 354 for each category for a user to select depending on whether the user wishes to modify each of the who, what, when, and where icons. Respective submit buttons 356 are also shown and are associated with the category and radio buttons in their respective row.

Thus, as may be appreciated from the UI 348, each of the icons may be separately and/or individually modified by selecting respective "yes" radio buttons associated with each icon, it being understood that another UI may then be presented responsive to selection of the respective submit buttons or the radio buttons themselves. However, in other embodiments a user may select the yes radio button for two or more icons/categories and then select any one of the submit button and/or a "submit all" button to then cause, e.g., either (1) subsequent UIs to be presented in sequence for modifying each of the icons selected based on input received at the UI 348 (e.g., based on selection of associated yes radio buttons, a who icon modification UI may be presented, and after the who icon has been modified on such a UI, another UI such as a what icon modification UI may be immediately presented thereafter to modify the what icon) or (2) a single UI may be presented for modifying two or more icons on the single UI.

Figure 29:
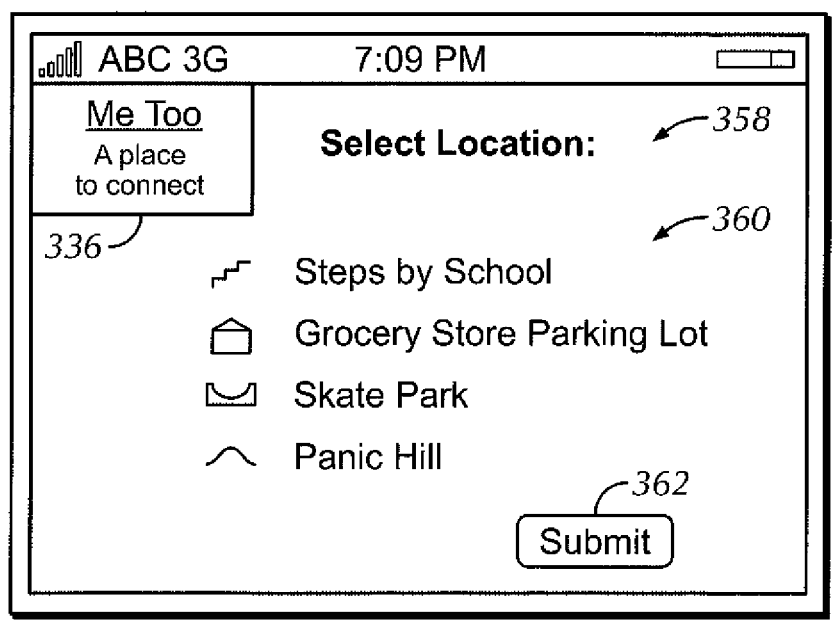
FIG. 29 is an exemplary UI for selecting a where icon.

Now in reference to FIG. 29, a UI 358 is shown as being presented on an example CE device smartphone for selecting a where icon. E.g., the UI 358 may be presented responsive to selection of the yes radio button on the UI 348 described above for modifying the where icon. Thus, the UI 358 includes an indicator 358 prompting the user to select a location from a list 360 to modify the "original" where icon determined by Charlie, or if Charlie's post did not include an "original" where icon, to add one to it. Note that each of the locations shown on the list 360 has an icon associated with it so that at least the icon may be included to modify Charlie's post, where the icon may be representative of the location (e.g., the "steps by the school" location for skateboarding is associated with an icon showing stairs). The UI 358 also includes a submit button 362 which may be used to submit the user's selection once one of the locations from the list 360 has been selected, although it is to be understood that in some embodiments mere selection of a location from the list 360 may cause the selection to be submitted automatically without the user taking any further action on the UI 358 such as selecting the submit button 362.

Figure 30:
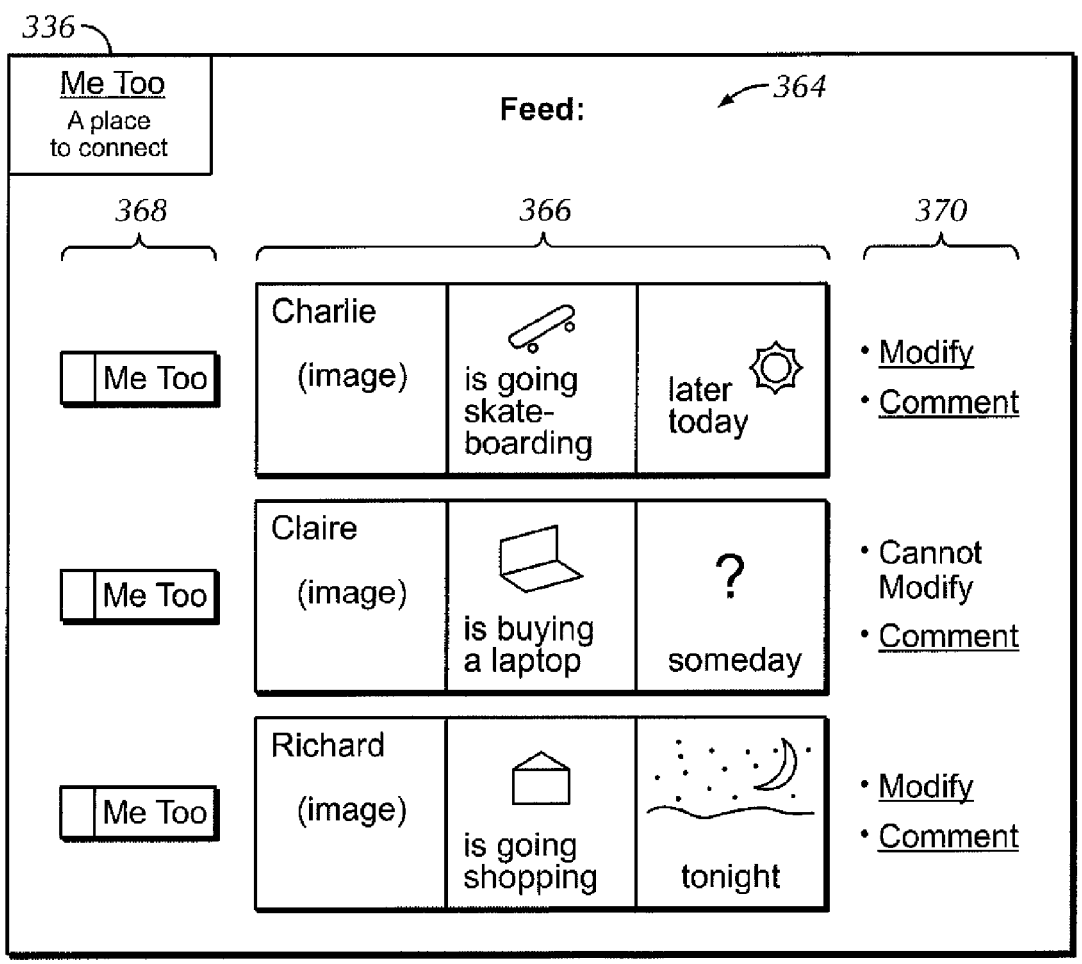
FIGS. 30 and 31 are an exemplary UIs showing a message feed for the Me Too social networking service.

Continuing the detailed description in reference to FIG. 30, an exemplary message/post feed UI 364 accessible to a user of the Me Too social networking service when, e.g., the user logs into their Me Too social networking account is shown. The feed may show one or more posts created and published (e.g., to the public or to friends) on the Me Too social networking service by the user's Me Too friends. Accordingly, the UI 364 includes original posts 366 from the user's social networking friends (it being understood that modified posts may also be included, such as a post created by one of the user's friends and modified by the user and/or another of the user's friends). Note that next to each of the posts 366 is a respective Me Too icon 368 in accordance with present principles for the user to select in order to indicate via, e.g., the social networking service that the user intends to participate in the activity associated with the post.

Furthermore, the UI 364 includes selectable links 370 adjacent to respective posts 366. Each post may have plural links associated with it. Thus, each of the posts 366 has a "comment" link which is selectable for a user to comment on the friend's post by, e.g., causing a text entry box to appear on the UI 364 for entry of a comment which may then be published along with the post to the user's friends and/or friends of the individual that originally created the post.

In addition, a selectable modify link may also be included next to each respective post for selection to modify the original post (or further modify an already modified post) in accordance with present principles. Thus, in exemplary embodiments, selection of a modify link from the UI 364 may cause the UI 348 of FIG. 28 to appear to thereby modify the post. Note that Claire's post as shown on the UI 364 is not modifiable by the user from, e.g., the user's social networking account because, e.g., Claire has not approved the user to modify her posts, only view them.

Figure 31:
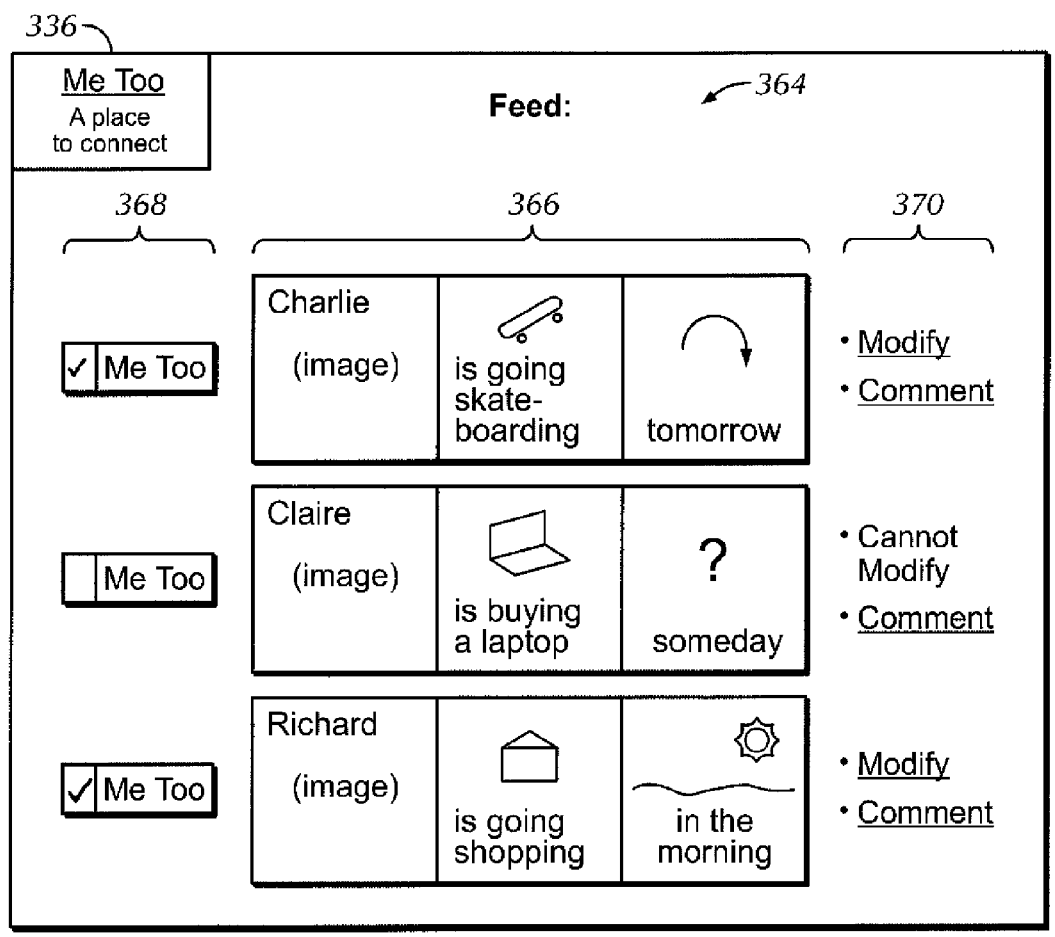

Accordingly, after modifying a post and in reference to FIG. 31, the UI 364 for a feed of posts is shown as including plural modified posts, it being understood that the posts have been modified by the user at least in part based on, e.g., selection of respective modify links for each post and then modifying at least one icon for each post as set forth above. Contrasting FIGS. 30 and 31, it may be appreciated that Charlie's post, specifically the when icon, has been modified by the user as shown in FIG. 31 to reflect that the activity occur "tomorrow" rather than "later today." As may also be appreciated from FIG. 31, the Me Too icon associated with Charlie's post also indicates that the user will be joining in the activity. The Me Too icon may be "checked" to indicate the user will be participating in the activity, e.g., automatically responsive to the user modifying Charlie's post such that a check appears in the box of the Me Too icon without the user actually selecting the Me Too icon, and/or may be done by the user actually selecting the Me Too icon to indicate that the user will be participating in the activity.

As another example and still contrasting FIGS. 30 and 31, Richard's post as shown in FIG. 31 now indicates that the activity associated with Richard (shopping) will occur "in the morning" rather than "tonight" and thus includes a different icon for "in the morning" relative to the icon for "tonight." Note that the Me Too icon associated with Richard's post also indicates that the user will be joining Richard in the activity. Last, note that Claire's post as appearing in the feed has remained unchanged relative to FIG. 30 since the user is not approved to modify Claire's post.

In addition to the foregoing, present principles recognize that original posts may be modified in still other ways, such as based on a poll. The poll may be published, e.g., in a feed such as those described above or otherwise presented to a user (e.g., on a separate page) through a social networking service. Results of the poll may then modify an original message at least in part. Furthermore, in some implementations the poll may be accessible to at least one friend of the individual that created the original post, although it is to be understood that the poll may be publically available so that, e.g., fans of a public figure can participate in the poll and vote through the social networking service.

Thus, an exemplary poll UI 372 is shown in FIG. 32 and may be presented through a social networking service. The UI 372 includes at least one poll question 374, in this case asking the user when the user would like to join Charlie in the activity of skateboarding. Other questions may be asked, such as generally whether the user would like to join Charlie, whether the user would like to engage in a different activity with Charlie, whether the user would like to invite other friends to join in the activity, whether the user would like to participate in the activity in more than one location and/or more than once (e.g., on a recurring basis), etc.

Regardless, the UI 372 includes plural radio buttons 376 for the question 374 that are selectable, the selection associated with each of the radio buttons 376 understood to be associated with a desired response to the question and constituting a vote in the poll (e.g., after selecting the submit button 378). Note that more than one question and/or poll may be presented at the same time on the UI 372 in accordance with present principles. Furthermore, the polls may or may not be related to the same original message, but in the exemplary case shown in FIG. 32 the two polls are related to the same post created by Charlie. Thus, in addition to the UI 372 asking the user when the user would like to join Charlie, the UI 372 also includes a question 380 asking the user where the user would like to skateboard with Charlie. Radio buttons 382 associated with different responses to the question are shown for selection by a user to input the user's vote on the poll.

For completeness, note that in the case where more than one poll and/or question is presented on a single poll UI such as the UI 372 shown, not all questions necessarily need be responded to. Thus, a user may select one of the radio buttons 376 without selecting any of the radio buttons 382. However, in other embodiments, if the user selects one of the radio buttons 376 but not one of the radio buttons 382, a pop-up prompt may be presented indicating that the user must respond to all questions in order to submit their vote to be included in the poll results. Regardless, it is to be understood that once the user's vote(s) has been submitted to the social networking service, the vote may be, e.g. added to a tally of votes such that a particular when and/or where selection/icon receiving the most votes causes the social networking service to modify Charlie's original post automatically and accordingly, e.g., without further user input.

Now in reference to FIG. 33, an index of users approved to modify original messages/posts in accordance with present principles is shown. Thus, FIG. 33 shows a UI 384 listing at least one friend associated with the social networking account of the user. As shown, three users and associated who icons 386 are presented on the UI 382: Claire, Richard, and Roy. Note that in some embodiments, the text and who icons 386 for each person may be selectable to, e.g., view a profile associated with the friend (it being understood that who icons and associated text on any of the UIs described herein may similarly be selectable to view the friend's profile).

Also shown on the UI 384 are plural boxes 388. The boxes 388 are understood to be selectable by the user based on whether the user desires that the friend associated with the respective box be able to modify the user's post. Thus, if a box contains an "X" in it, this indicates that the friend has been approved by the user (e.g., by clicking or otherwise selecting the box to cause the "X" to appear) to modify the user's posts. As shown in FIG. 33, all three of the boxes 388 contain an "X," thus indicating that Claire, Richard, and Roy are all approved to modify the user's original posts.

In some embodiments, if the user deselects one of the boxes 388 such that the friend associated with the deselected box is no longer approved to modify the user's posts, the friend may still appear on the UI 384, albeit with an empty approval box such that the user is not approved to modify the user's posts. However, in other embodiments, should a box for a friend be deselected, the entry on the UI 384 associated for the friend may be removed from the UI 384.

Still in reference to FIG. 33, an add box 390 is also included on the UI 384 so that a user may input the name of another friend the user wishes to add to the index and approve for modifying the user's posts. A submit button 392 may then be selected to add the user to the index represented on the UI 384. It is to be understood that, when a user is added using the text box 390 and submit button 392, a box 388 that will be associated with the user may automatically include an indication (e.g., an "X") that the user has been approved to modify posts such that no further action is required by the user once the friend is added to the index for the friend to be approve to modify the user's posts.

Last, note that while the user is inputting a name to the box 390, a drop-down list may dynamically appear on the UI 384 of possible friend choices based on partial input to the box 390 at any given time. For example, at a point where only the letter "J" is entered to the text box 390, the social networking service may present a list of friends which may be selected by the user to complete the entry to the box 390 rather than manually typing out the entire name, in this case names beginning with the letter J (e.g., a list including the user's friends John, Jason, and James).

Figure 34:
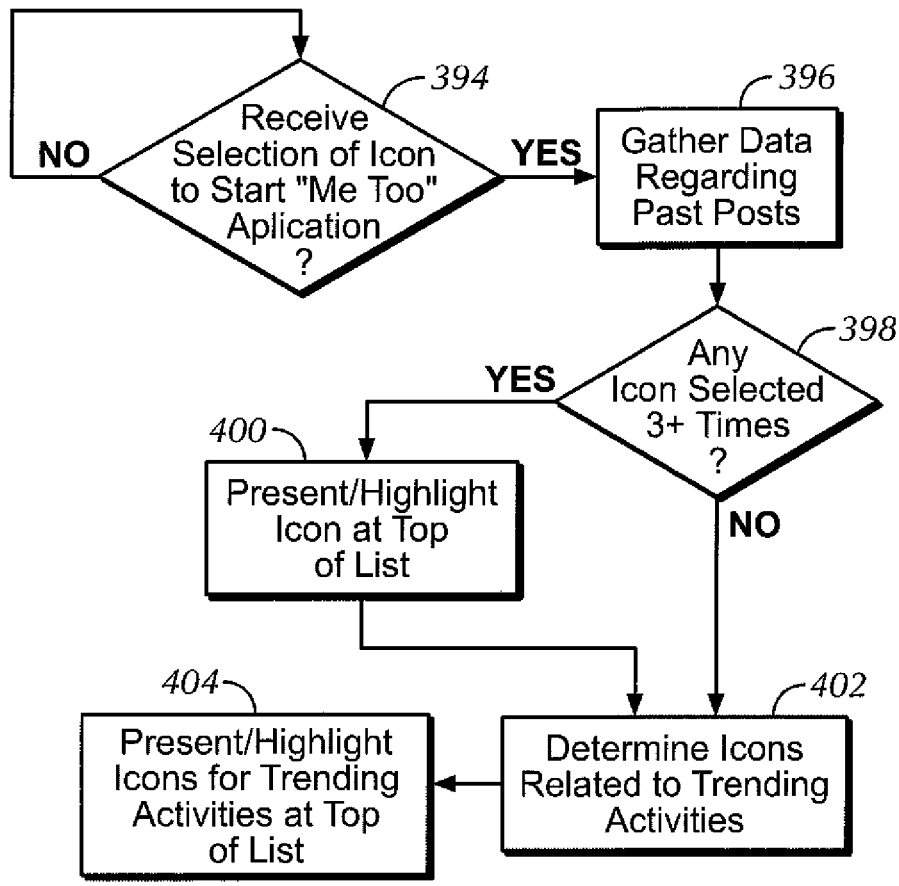
FIG. 34 is a flow chart of exemplary logic for determining icons to present for selection to create a Me Too post based on behavioral tracking and trending posts.

Moving on, reference is now made to FIG. 34. FIG. 34 shows exemplary logic for determining icons to present for selection to create a Me Too post based on behavioral tracking and trending posts. Beginning with decision diamond 394, the logic receives selection of an icon to initiate the Me Too social networking service, and/or initiate creation of a Me Too post. Then at block 396 the logic gathers data regarding past posts created by the user (e.g., data for the posts themselves, and/or data related to individual icons included in the posts). The logic then moves to decision diamond 398 where the logic determines whether any of the posts and/or individual icons (e.g., who, what, when, where icons) have been selected, e.g., three or more times, although it is to be understood that the determination made at block 398 may be based on any number of past selection times including a single time, and furthermore the number of times may be predetermined and/or determined based on user input.

If a negative determination is made at diamond 398, the logic proceeds directly to block 402. However, if a positive determination is made at diamond 398, the logic moves to block 400 before proceeding to block 402. At block 400, the logic presents at least one icon determined to have been selected three times at diamond 398 at, e.g., the top of a list of icons presented on a UI for creation of a Me Too post in accordance with present principles, it being understood that in addition to or in lieu of presenting the at least one icon at the top of the list, the icon may also be visually distinguished and/or highlighted to indicate to the user that it has been previously selected.

Then logic then proceeds to block 402 where the logic analyzes trending activities, messages, and/or posts that have bee posted to the Me Too social networking service by, e.g., plural people and determines icons (e.g., who, what, when, where icons) related to at least one trending activity. The logic then moves to block 404 where the logic presents at least one icon analyzed as trending at block 402 at, e.g., the top of the list of icons described above for creation of a Me Too post in accordance with present principles, it being understood that in addition to or in lieu of presenting the at least one icon at the top of the list, the trending icon may also be visually distinguished and/or highlighted to indicate to the user that it is trending.

It may be appreciated that, using the exemplary logic of FIG. 34, the social networking service and/or a CE device associated with the user may recommended to the user icons and information associated with the icons for inclusion of those icons and/or information in a message and/or social network post using either or both behavioral tracking and an analysis of activities trending amongst the user's friends, or activities trending amongst the general population of people on the Me Too social networking service. Thus, at least one icon previously selected at least once for a past message may be recommended to the user.

Figure 35:
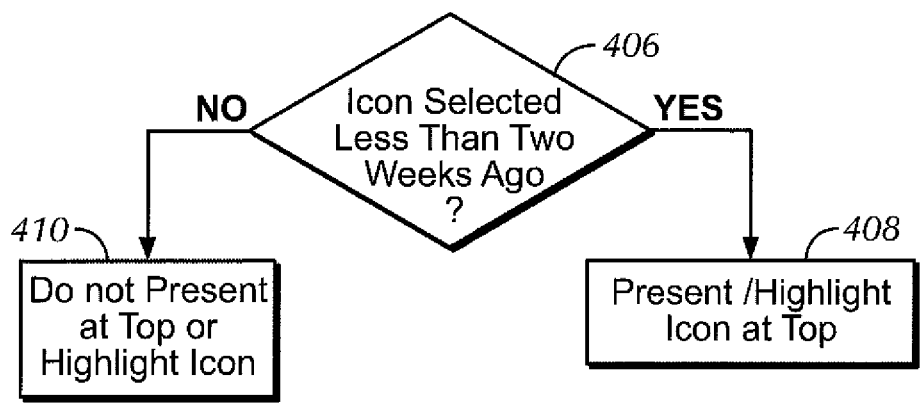
FIG. 35 is a flow chart of exemplary logic for determining whether a predefined period for using behavioral tracking of past messages has expired.

Also note that, in some embodiments, after the expiration of a (e.g., predefined) period of time, the one or more previously selected icons that are presented at the top of a list and/or visually distinguished for creating a new original post based on whether the activity was trending and/or based on behavior tracking may no longer be visually distinguished or placed at the top of a list from other icons. It may not be presented at all, or may simply be presented in the list as it otherwise would absent being trending or previously selected. Exemplary logic shown in FIG. 35 thus shows a flow chart for determining whether such a predefined period has expired.

Beginning at decision diamond 406, the logic determines whether an icon determined to have been selected based on, e.g., behavioral tracking has been selected less than two weeks from the time of execution of the logic. If the logic determines that the icon has been selected less than two weeks ago, the logic may then present the icon at the top of a list and/or visually distinguish it from other icon at block 408 in accordance with present principles. However, if a negative determination is made at diamond 406, the logic instead proceeds to block 410 where the logic does not present the icon in a way that distinguishes it and/or places it higher on a list of icons used to create a post.

In addition to the foregoing, present principles recognize that if more than one icon for, e.g., a particular category such as a what icon category is determined to have been selected based on, e.g., behavior tracking or what is trending, these icons may be prioritized and/or ranked such that all icons previously selected or trending are presented in a visually distinguished manner and/or at the top of the list, but with icons more frequently selected relative to others appearing first on the list and/or even further visually distinguished from other previously selected or trending icons that have been selected less or are not trending as much. However, in still other embodiments the icons determined to have been trending and/or previously selected may be presented on a list of icons at random.

Moreover, in some embodiments, if desired the behavioral tracking may be even more particular such that, e.g., if a determination is made that a user selects a particular icon at a particular time (e.g., every Wednesday in the afternoon or from 6:00 p.m. to 8:00 p.m.) that icon may be presented at the top of a list and/or highlighted only at that time (e.g., on Wednesday afternoon or between 6:00 p.m. and 8:00 p.m. when a post is being created). Similar principles can be applied when a user has previously selected an icon at a particular location such that the same icon may be distinguished on a list of icons when the user is at that location again, as well as when a user is physically near a friend connected to the user through the Me Too social networking service (e.g., using GPS receivers of respective CE devices associated with the user and friend) in cases where, e.g., friends who are together typically do the same activity and thus create the same type of activity posts when they are together.

Figure 36:
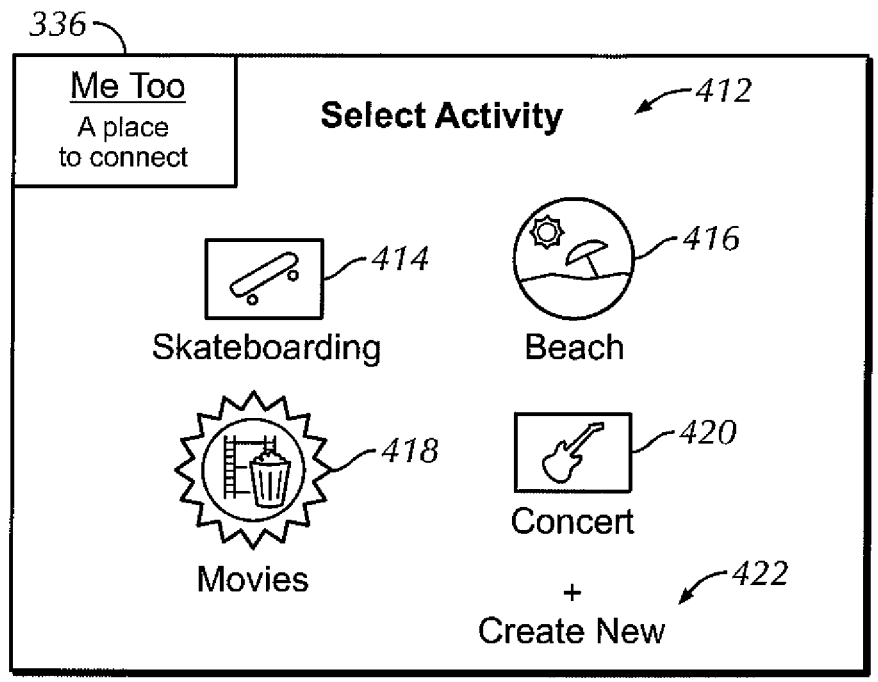
FIG. 36 is an exemplary icon selection UI for creating a Me Too message with visually distinguished icons.

As shown in FIG. 36, an exemplary icon selection UI 412 for creating a Me Too message/post and presentable on a CE device and, e.g., through a Me Too social networking service is shown. In the exemplary case shown, the icons are what icons. As shown, the skateboarding what icon 414 includes a bolded border, though any other portion of the icon, or the icon in its entirety, may be bolded. The beach what icon 416 is also bolded.

Thus, for example, both the skateboarding and beach what icons may have been determined to have been associated with trending activities and/or previously selected within a predetermined time period by the user, and accordingly are visually distinguished by bolding their borders relative to, e.g., the border of the concert icon 420. Also note that, assuming the skateboarding what icon is trending more or has been selected more frequently than the beach what icon, the skateboarding what icon is given priority over the beach what icon such that the skateboard what icon appears first, left to right, from the beach what icon, and first and/or higher, up to down, from the concert what icon.

As also shown on the UI 412, the movies what icon is visually distinguished from the other icons with spikes surrounding it to, e.g., provide a halo effect. Thus, it may be appreciated that icons may be visually distinguished in different ways. Accordingly, if desired, trending icons may be distinguished in one way (e.g., using spike) and previously selected icons may be distinguished in a different way (e.g., using bolding) so that a user using the UI 412 to select a what icon can discern the difference between trending icons and previously selected icons. Furthermore, in some embodiments if the icon is both trending and previously selected, it may be presented with two visually distinguishing characteristics (e.g., it may be bolded and also surrounded by spikes). Last, note that a create new selector 422 is also presented for creating a new icon as set forth above.

Figure 37:
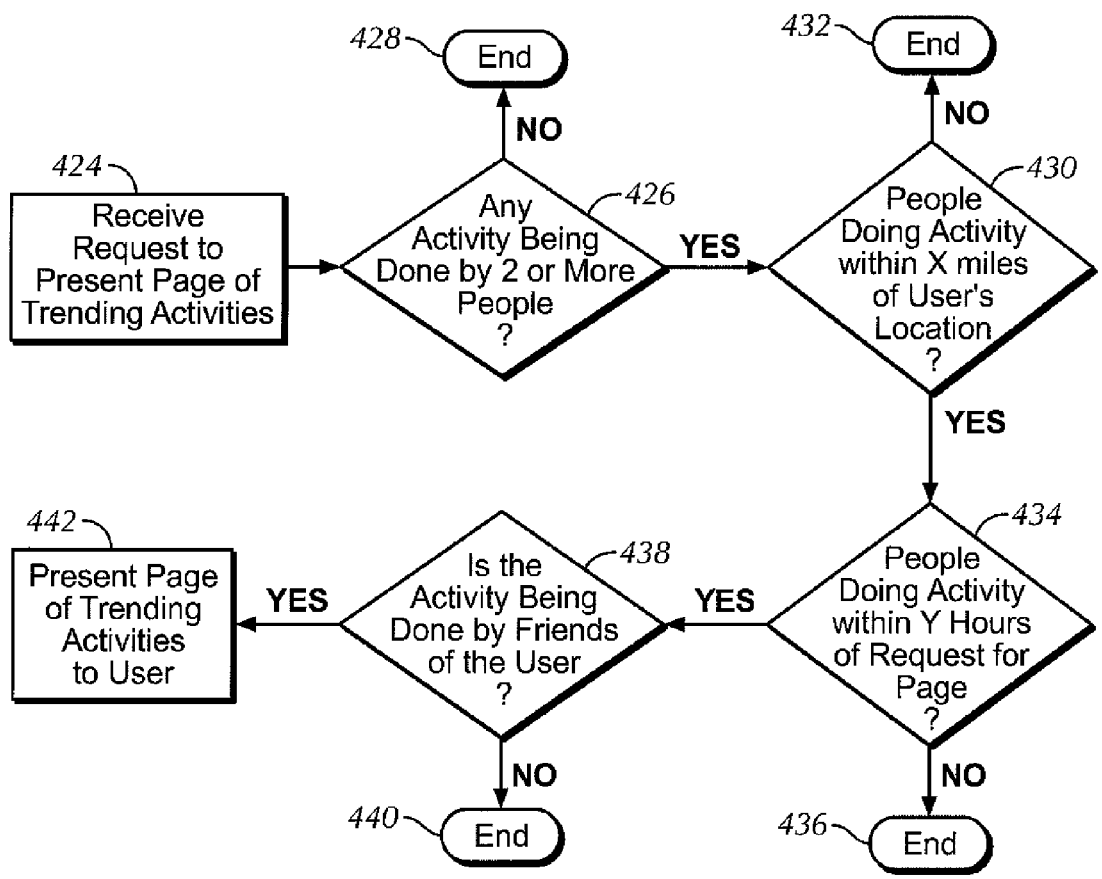
FIG. 37 is a flow chart of exemplary logic for presenting a page of trending activities to a user.

Continuing the detailed description in reference to FIG. 37, an exemplary flow chart of logic for presenting a page of trending activities to a user is shown. Beginning with block 424, the logic receives a request to present a page of trending activities (e.g., on a Me Too social networking service). It is to be understood that this request may be made by a user so that a user can view a trending page as described herein to help the user determine the type of message, post, and/or activity the user wishes to create and participate in to be, e.g., posted through the Me Too social networking service. Thus, present principles recognize that a trending page may be presented responsive to a request to create a message and/or post in accordance with present principles, and that subsequent to presenting the trending page, one or more UIs for creating a message and/or post may be presented for a user to create a message/post and then transmit/post it.

Regardless, after block 424 the logic moves to decision diamond 426 where the logic determines whether at least one activity has been or will be participated in my two or more people, thereby constituting a "trending" activity in some embodiments. If a negative determination is made at diamond 426, the logic may end at block 428. However, if a positive determination is made at diamond 426, the logic proceeds to decision diamond 430 where the logic determines whether the two or more people are or will be participating in the activity within a predetermined/predefined (e.g., by the user) distance from the current location of the user (e.g., which may be determined using a GPS receiver on the user's CE device from which the Me Too social networking service is accessed).

If a negative determination is made at diamond 430, the logic may end at block 432. However, if a positive determination is made at diamond 430, the logic proceeds to decision diamond 434 where the logic determines whether two or more people are or will be participating in the activity within a predetermined/predefined (e.g., by the user) period of time, e.g., from when the logic is executed and/or when a trending page is requested by the user.

If a negative determination is made at diamond 434, the logic may end at block 436. However, if a positive determination is made at diamond 434, the logic proceeds to decision diamond 438 where the logic determines whether the activity is being done by at least one social networking friend of the user rather than, e.g., a user of the Me Too social networking service that is not a friend and/or otherwise connected to the user.

If a negative determination is made at diamond 438, the logic may end at block 440. However, if a positive determination is made at diamond 438, the logic proceeds to decision block 442 where the logic creates and presents a page of the trending activities satisfying the requirements discussed above. It is to be understood that although FIG. 37 was described as though all three requirements must be met to present at least one trending activity to a user (the location of the user, the time the page is requested or the social networking service is accessed, and that the activity is related to a social networking friend of the user), only one or any combination of the foregoing determinations, but not necessarily all of them, may be made to then present a trending page to a user in accordance with present principles.

Figure 38:
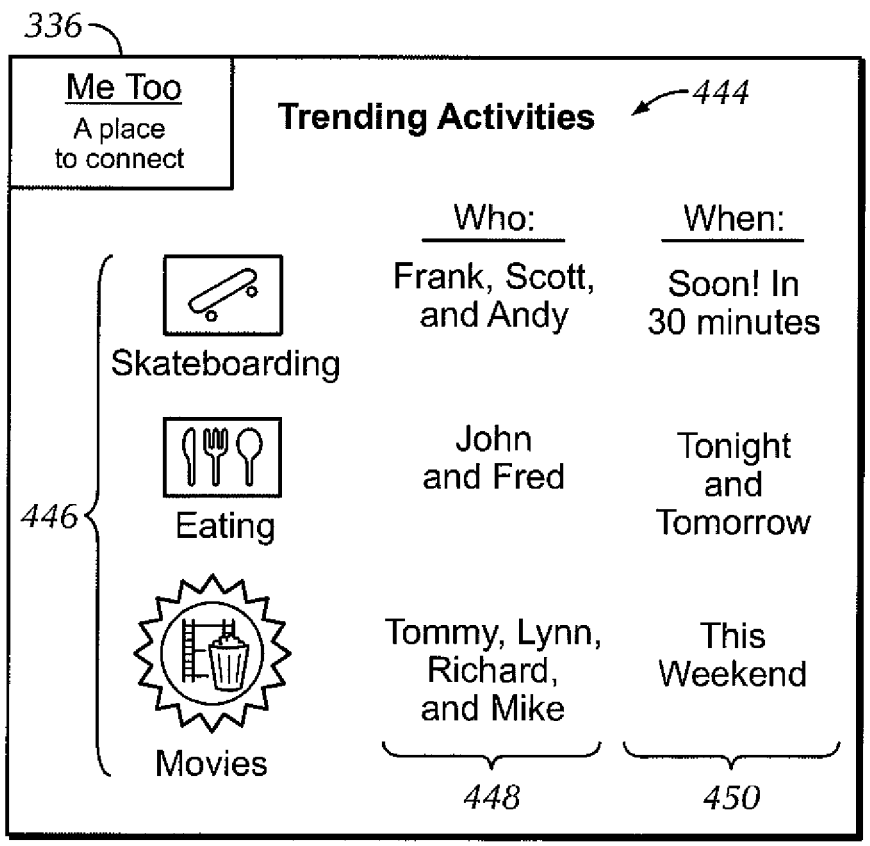
FIG. 38 is an exemplary page of trending activities.

As shown in FIG. 38, an exemplary page 444 of trending activities is shown. The page 444 includes a list of icons 446 associated with trending activities. The page 444 also includes a who column 448 indicating the people (e.g., social networking friends of the user) that are or will be participating in the activity, as well as a when column 450 listing at least one time for each activity when the other individuals will be participating in the activity. Note that although not shown, a where column indicating at least one location where the activity will take place as determined through the social networking service may also be presented on the page 444.

With no particular reference to any figure, it is to be understood that all of the icons, logic, and UIs described herein are exemplary and that they may be combined in other ways and/or show combinations of who, what, and when icons that do not necessarily include all three in a completed activity icon. Thus, e.g., activity icons may be created that combine only who and what icons. It is to also be understood that all of the UIs described above are exemplary and may include, e.g., more or less information and selectors than what is described above in certain embodiments.

Further, it is to be understood that the messages and/or icons disclosed herein may be transmitted automatically such that they do not require additional user action/input once the selectors described above are selected. For example, after a selection of a when icon at block 94 of FIG. 2, an activity icon may be created by the processor and automatically transmitted to one or more contacts. In addition, it is to also be understood that in response to receiving an activity icon/message, e.g., a text message, email, etc., response may be transmitted back to the sender rather than a Me Too accept message if desired, and the text message or email may even be created by a recipient using audible commands input to the recipient's CE device.

Even further, note that cloud computing/technology may also be used in accordance with present principles.

In addition to all of the foregoing, note that the devices described above may be GPS enabled and that the icons and UIs described above may include GPS selectors as well that, when selected, cause the device to present directions to the activity in which the user of the device will participate. Thus, in some embodiments, the creator of the activity may input specific location information to his or her device when creating a Me Too activity icon so that others may obtain directions when joining in the activity by selecting, e.g., a Me Too icon such as those described above from their respective devices.

Moreover, still other activities besides those described above may be participated in. For instance, an activity icon can be created for, e.g., car shopping, making a to-do list, making a reading list, making a shopping list (e.g., grocery shopping), etc. As another example, a Me Too application can be used to share a gift registry E-store with friends so that friends may purchase gifts for a wedding. Furthermore, selection of a purchase activity icon by a recipient (e.g., such as for the computer described above) may cause another function/application to be launched on the recipient's CE device, such as to search for the best price for the item to be purchased (e.g., Sawyer may be able to locate an E-store selling the computer Kate wants for less than Amazon.com). Even further, when purchasing an item for a Me Too contact in accordance with present principles, other embodiments may include, e.g., responsive to selection of a Me Too icon on a webpage, a third party server presenting a UI or some other type of interface/input screen to the purchaser requesting the purchaser input information such as who the purchaser will be sending the item to. The what icon for the item could even be auto-filled on such an interface, as could a certain time when the purchase will be made and/or the item will be delivered. This information could also be published on a Me Too platform/service or another social networking services in accordance with present principles.

Additionally, the who, what, and when icons described herein may be created by users of a Me Too application, but note that some icons (e.g., default icons) may be included in the Me Too application when, e.g., initially installed on a CE device. Images for the icons described above may also be chosen from, e.g., websites and need not necessarily be photographs of respective Me Too users. Character recognition may also be used, e.g., in conjunction with voice commands to select images for the icons from web pages. Also note that emoticons may also be included in any of the messages and/or icons described above to reflect a user's state of mind.

Also, note that other ways of creating icons such as a what or who icon may be used in accordance with present principles. For example, an image stored on a CE device may be used for a what icon, and/or a table of images and words that may be associated with them may be presented for a user to select a particular image to include particular descriptive words overlaid on it.

It may now be appreciated that a user may quickly and easily share an event in which they are going to participate with friends and family. This may be done on relatively small devices such as, e.g., smart phones or smart watches that would otherwise make it difficult to share such information because of their small screen size and hence limited ability to type and display textual information pertaining to an activity. In this sense, the activity icons described above provide a story board of information that can be exchanged over social media.

Moreover, it is to be understood that "users" of the social networking service may not only be private individuals, but also, e.g., companies, news organizations, other business entities, etc.

Present principles also recognize that the "original" messages/posts described above may be partial messages/posts such that the person initially creating the post may, e.g., select who, what, and when icons, but not a where icon. A friend of the user may then add a where icon to the post, in addition to modifying the who, what, and when icons of the original post if desired.

In addition to the foregoing, present principles recognize that a third party affiliate system may be implemented where third parties such as commercial sponsors can make and customize recommendations for particular users based on behavior trends of the user using the Me Too principles and/or the social network and present such recommendations to users through Me Too messages and/or the Me Too social networking service feeds or pages (e.g., inserting them into a feed of posts). Accordingly, the Me Too social networking service may be used by third party affiliates/advertisers not only to advertise a product, but also to direct people to a particular location to participate in a particular activity (e.g., to eat at a particular restaurant at a particular location on a particular night at a discount through a video ad inserted into the user's feed) using icon messages/posts in accordance with present principles. Such posts may be intermixed with friend posts and/or messages.

Moreover, present principles recognize that a Me Too social networking service can recommend activities to a user based on current and past searches by the user, either search engine searches using search engines not associated with the Me Too application/service, or searches through the Me Too social network using a Me Too search function. Furthermore, in addition to user profiles that are viewable by friends of the user and/or the public on the "front end" of the Me Too social networking service (including profile pages), "back-end" profiles may also be used by the Me Too service to track behavior, and current and past searches.

Finally, note that links to websites on the Internet may also be shared in Me Too messages and/or over the Me Too social networking service in accordance with present principles.

While the particular SYSTEM AND METHOD FOR SHARING EVENT INFORMATION USING ICONS is herein shown and described in detail, it is to be understood that the subject matter which is encompassed by the present invention is limited only by the claims.

What is claimed is:

1. An apparatus comprising:
   at least one computer memory that is not a transitory signal and that comprises instructions executable by at least one processor to:
   transmit a message accessible to at least one recipient device, the message including data representing at least one non-alphanumeric who icon representing a person, at least one non-alphanumeric what icon representing an event or activity or event and activity, at least one non-alphanumeric when icon representing a time associated with the event or activity or event and activity, and data representing a participation icon selectable at the at least one recipient device to cause the at least one recipient device to transmit a reply message to the apparatus indicating that a user associated with the at least one recipient device will participate in the event or activity or event and activity;
   modify at least one of the following that is represented by data included in the message based on input from the at least one recipient device: the at least one who icon, the at least one what icon, the at least one when icon, the modify including changing an appearance of a modified icon from a first appearance in which the modified icon is presented on the display to a second appearance in which the modified icon is presented on the display; and
   automatically select the participation icon responsive to the modify.

2. The apparatus of claim 1, wherein data included in the message representing the at least one when icon is modifiable based on input from the at least one recipient device.

3. The apparatus of claim 1, wherein the message includes data representing at least one non-alphanumeric where icon representing a location.

4. The apparatus of claim 3, wherein data representing the at least one where icon is modifiable based on input from the at least one recipient device.

5. The apparatus of claim 2, wherein a modification to the message is accessible by the apparatus.

6. The apparatus of claim 4, wherein a modification to the message is accessible by the apparatus.

7. The apparatus of claim 1, wherein the message is accessible through a social networking service and constitutes an original post on the social networking service, the data for original post itself being modifiable rather than adding to the post through an additional comment.

8. The apparatus of claim 1, wherein the message is accessible through a social networking service and constitutes an original post on the social networking service, the data for original post itself being modifiable rather than replying to the post.

9. The apparatus of claim 1, wherein the at least one who icon, the at least one what icon, or the at least one when icon is modifiable based on a poll such that the results of the poll modify the at least one who icon, the at least one what icon, or the at least one when icon at least in part, the poll being accessible to the at least one recipient device for participation in the poll.

10. The apparatus of claim 1, wherein the instructions are executable to transmit the message at least in part by creating an activity page on a social networking service, the activity page being accessible to the at least one recipient device, the activity page reflecting information regarding the event or activity or event and activity.

11. The apparatus of claim 2, wherein the message is modifiable based on input from the at least one recipient device only if the at least one recipient device is included in an index of recipients approved to modify messages transmitted by the apparatus, the index being determined by a user associated with the apparatus.

12. An apparatus comprising:
    at least one computer memory that is not a transitory signal and that comprises instructions executable by at least one processor to:
    receive an original message, the original message including data representing at least one non-alphanumeric icon, the at least one non-alphanumeric icon including at least one who icon representing a person, or at least one what icon representing an event or activity or event and activity, or at least one when icon representing a time associated with the event or activity or event and activity, and data representing a participation icon selectable at at least one recipient device of the original message to cause the at least one recipient device to transmit a reply message to the apparatus indicating that a user associated with the at least one recipient device will participate in the event or activity or event and activity;
    determine whether input has been received from a user interface (UI) of the recipient device presenting plural selectable icons selectable to modify at least one non-alpha numeric graphics object within the non-alphanumeric icon received in the original message to render a modified icon;
    automatically select the participation icon responsive to rendering a modified icon; and
    transmit a modified message including the modified icon back to a transmitter of the original message.

13. The apparatus of claim 12, wherein at least one who icon or what icon or when icon or who icon and what icon or who icon and when icon or what icon and when icon or who icon and what icon and when icon selected at least once for a past message is recommended to the user.

14. The apparatus of claim 12, wherein the instructions are executable to present a user interface for creating the original message, the user interface including a who icon or what icon or when icon or who icon and what icon or who icon and when icon or what icon and when icon or who icon and what icon and when icon, and wherein at least one who icon or what icon or when icon or who icon and what icon or who icon and when icon or what icon and when icon or who icon and what icon and when icon selected at least once by the user for a past message is recommended by visually distinguishing it on the user interface from other icons based on at least one previous selection of the selected icon.

15. The apparatus of claim 14, wherein after the expiration of a predefined period, the at least one previously selected who icon or what icon or when icon or who icon and what icon or who icon and when icon or what icon and when icon or who icon and what icon and when icon is no longer visually distinguished from other icons.

16. The apparatus of claim 12, wherein the instructions are executable to present a user interface for creating the original message, the user interface including a who icon or what icon or when icon or who icon and what icon or who icon and when icon or what icon and when icon or who icon and what icon and when icon, and wherein at least one who icon or what icon or when icon or who icon and what icon or who icon and when icon or what icon and when icon or who icon and what icon and when icon selected at least once for a past message by the user is recommended by causing it to appear higher on a list of icons presented on the user interface relative to other icons that have not been previously selected as much as the selected who icon or what icon or when icon or who icon and what icon or who icon and when icon or what icon and when icon or who icon and what icon and when icon.

17. The apparatus of claim 12, wherein the instructions are executable to present a user interface for creating the original message, the user interface including a who icon or what icon or when icon or who icon and what icon or who icon and when icon or what icon and when icon or who icon and what icon and when icon, wherein at least one who icon or what icon or when icon or who icon and what icon or who icon and when icon or what icon and when icon or who icon and what icon and when icon is related to a trending activity, and wherein the who icon or what icon or when icon or who icon and what icon or who icon and when icon or what icon and when icon or who icon and what icon and when icon related to the trending activity is recommended by presenting it on the user interface.

18. A method comprising:
accessing a social networking service;
receiving a message transmitted by an apparatus through the social networking service, the message including data representing at least one non-alphanumeric who icon representing a person, at least one non-alphanumeric what icon representing an event or activity or event and activity, at least one non-alphanumeric when icon representing a time associated with the event or activity or event and activity, and data representing a participation icon selectable by at least one recipient device to cause the at least one recipient device to transmit a reply message to the apparatus indicating that a user associated with the at least one recipient device will participate in the event or activity or event and activity;
presenting a user interface (UI) presenting plural icons selectable to establish an input at the at least one recipient device to modify an appearance of at least one of the the at least one who icon, the at least one what icon, or the at least one when icon in the message received through the social networking service; and
based on the input at the at least one recipient device, modifying at least one non-alpha numeric graphics object inside the at least one of the the at least one who icon, the at least one what icon, or the at least one when icon to have a shape that is different from a shape the at least one of the non-alpha numeric graphics object has in the message received through the social networking service; and
automatically selecting the participation icon responsive to modifying the at least one non-alpha numeric graphics object.

19. The method of claim 18, wherein the message is received subsequent to presenting a trending page to a user of the social networking service, the trending page including at least one indication of at least one trending activity, the trending activity being determined at least partially based on at least one of the following: a location of the user, a time the social networking service is accessed, a social networking friend of the user.

* * * * *